United States Patent [19]

Asada et al.

[11] Patent Number: 5,606,447
[45] Date of Patent: Feb. 25, 1997

[54] PLANAR TYPE MIRROR GALVANOMETER AND METHOD OF MANUFACTURE

[75] Inventors: Norihiro Asada, Saitama-ken; Masayoshi Esashi, Miyagi-ken, both of Japan

[73] Assignee: The Nippon Signal Co., Ltd., Tokyo, Japan

[21] Appl. No.: 507,244

[22] PCT Filed: Dec. 8, 1994

[86] PCT No.: PCT/JP94/02062

§ 371 Date: Oct. 19, 1995

§ 102(e) Date: Oct. 19, 1995

[87] PCT Pub. No.: WO95/17698

PCT Pub. Date: Jun. 29, 1995

[30] Foreign Application Priority Data

Dec. 20, 1993 [JP] Japan .................................. 5-320524

[51] Int. Cl.6 .................................................. G02B 26/10
[52] U.S. Cl. .......................... 359/199; 359/198; 359/224; 359/900
[58] Field of Search ....................... 359/198, 199, 359/212–214, 223, 224, 900; 310/36, 40 R; 156/662; 264/1.9; 427/162, 163.4, 166

[56] References Cited

FOREIGN PATENT DOCUMENTS

| | | | |
|---|---|---|---|
| 56-140316 | 11/1981 | Japan . | |
| 60-107017 | 12/1985 | Japan | 359/224 |
| 63-225217 | 9/1988 | Japan . | |
| 1-195417 | 8/1989 | Japan . | |
| 1-257916 | 10/1989 | Japan . | |
| 4-76611 | 7/1992 | Japan . | |
| 4-219912 | 8/1992 | Japan . | |
| 4-211218 | 8/1992 | Japan . | |
| 5-60993 | 3/1993 | Japan . | |
| 2271436 | 4/1994 | United Kingdom | 359/198 |

*Primary Examiner*—James Phan
*Attorney, Agent, or Firm*—Finnegan, Henderson, Farabow, Garrett & Dunner, L.L.P.

[57] ABSTRACT

A slim-type small size mirror galvanometer is made using semiconductor manufacturing techniques to form a silicon substrate 2 having a planar movable plate 5 and a torsion bar 6 for axially supporting the movable plate 5 formed integrally therewith, with a planar coil 7 and a total reflecting mirror 8 provided on an upper face of the movable plate 5. Upper and lower glass substrates 3, 4 are provided on upper and lower faces of the silicon substrate 2, and permanent magnets 10A, 10B and 11A, 11B are fixed to the upper and lower substrates 3, 4 at predetermined locations so as to produce a magnetic field at the planar coil 7. The direction and quantity of current flowing in the planar coil 7 is controlled to variably control the displacement angle of the movable plate 5 depending on the balance between the generated magnetic force and the torsion force of the torsion bar 6.

20 Claims, 21 Drawing Sheets

SPRING REACTIVE FORCE F' (μN)

DISPLACEMENT ANGLE φ (°)

MAGNETIC FORCE F (μN)

CURRENT i (mA)

HEAT Q (μW)

CURRENT i (mA)

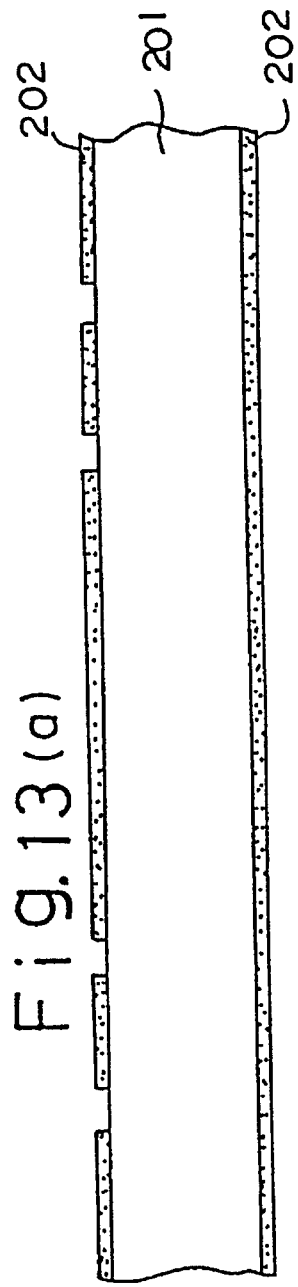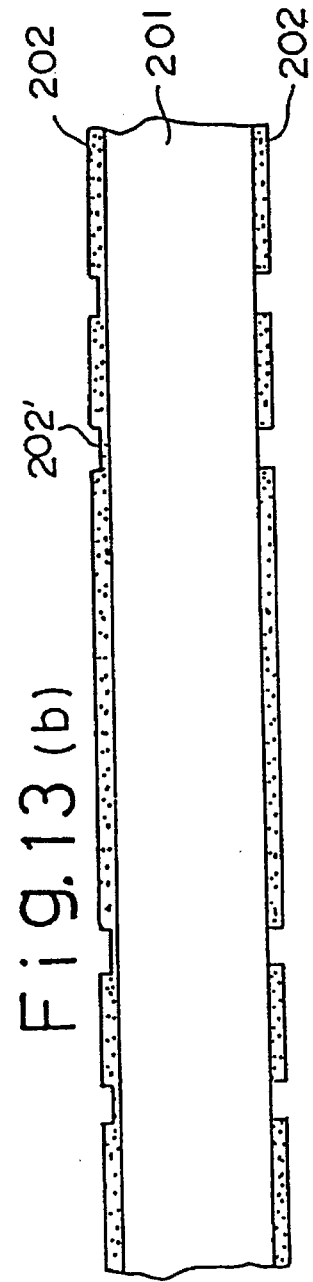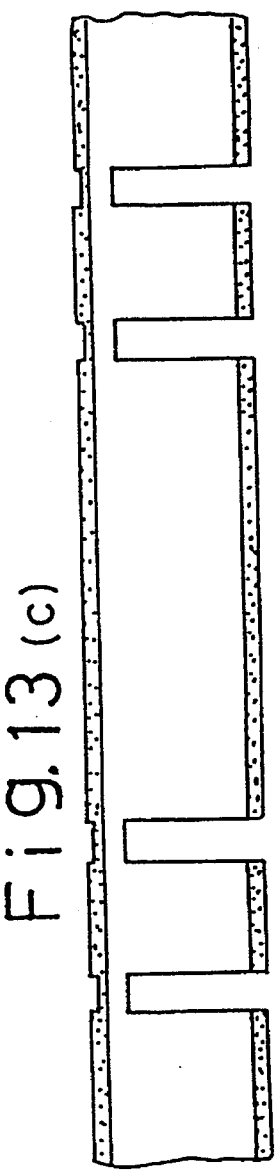

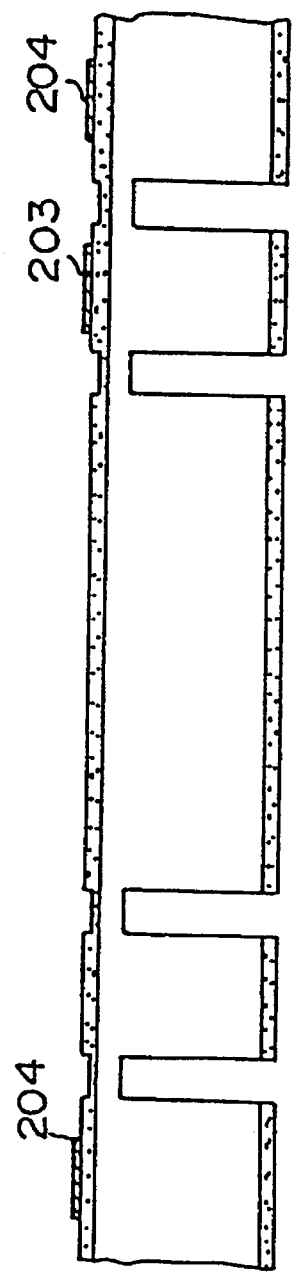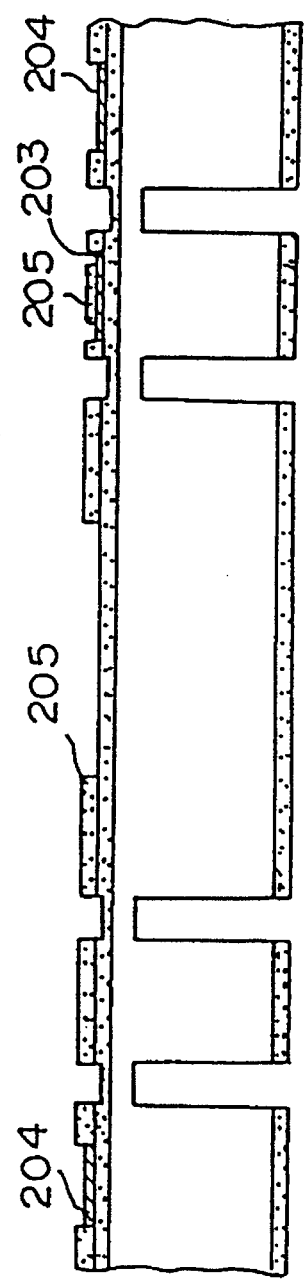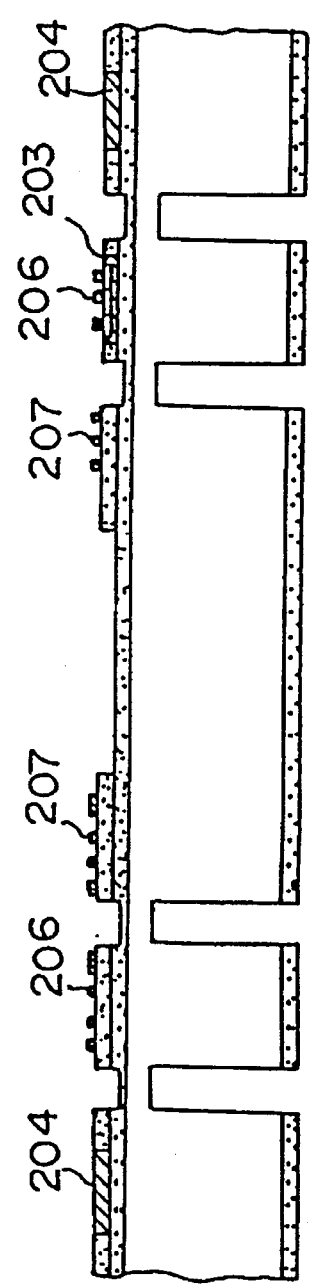

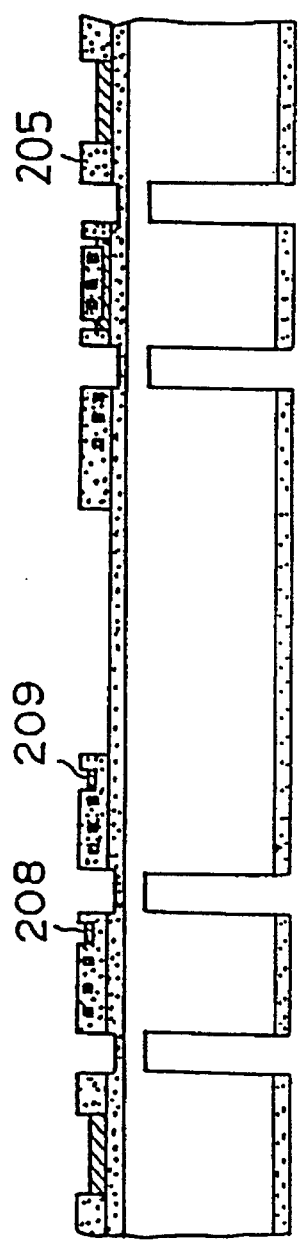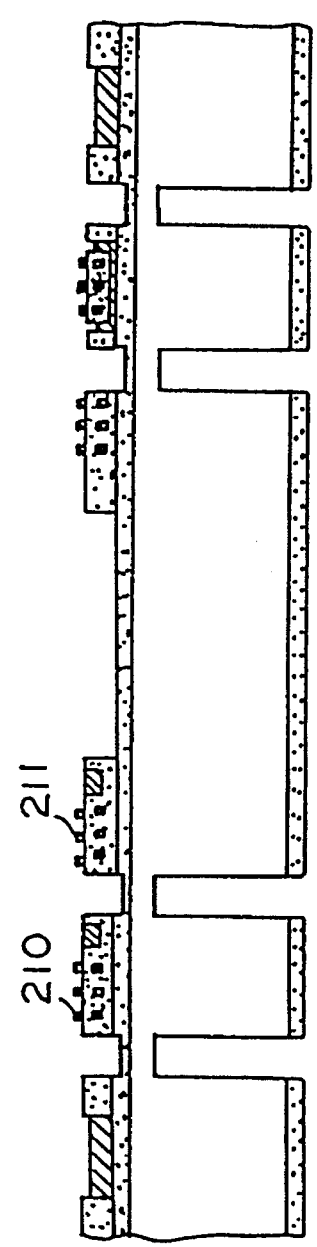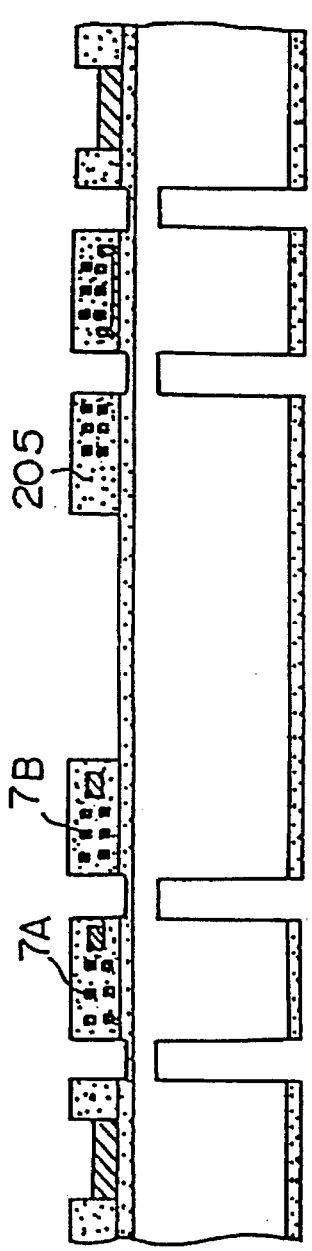

PLANAR TYPE MIRROR GALVANOMETER AND METHOD OF MANUFACTURE

TECHNICAL FIELD

The present invention relates to a mirror galvanometer suitable for example for laser beam scanning systems and the like, and in particular to a miniaturized planar type mirror galvanometer and its method of manufacture.

BACKGROUND ART

Mirror galvanometers are used for example in laser scanners which deflection scan a laser beam, operating on the theory that when an electrical current is passed through a movable coil arranged in a magnetic field, an electromagnetic force is generated due to the interaction between the electrical current and the magnetic field, producing a rotational force (torque) proportional to the electrical current. The construction involves a device using galvanometer theory with a movable coil rotating to an angle where the torque and a spring force are in equilibrium, the presence or absence and size of a current being detected by an indicator needle swung by the movable coil. However instead of the indicator needle a reflecting mirror is provided on a member which rotates with the movable coil.

In practice mirror galvanometers use for example a movable piece of iron instead of the movable coil arranged in a magnetic field, with a magnetic path formed around the periphery of the movable piece of iron by means of a magnetic body involving two permanent magnets and four magnetic poles. The magnetic flux between the poles is altered by changing the size and direction of a current flowing in a drive coil wound around the magnetic body, so that a reflecting mirror is swung by the movable piece of iron, to thus deflection scan a laser beam (see for example "Practical Laser Technics", Kyoritsu Publishing Company, Dec. 20 1987, p210–212).

With the development of microelectronics represented by the high integration of semiconductor devices, there is now a range of equipment which is both highly functional as well as being miniaturized, and laser scanning systems and the like which use the abovementioned mirror galvanometer thus become applicable, as with laser adapted equipment such as laser microscopes. There is also a requirement for even further miniaturization.

With the conventional mirror galvanometer however, further miniaturization is difficult due for example to the movable coil being mechanically wound. Therefore, further miniaturization of laser scanning systems using such mirror galvanometers, and the laser adapted equipment using such laser scanning systems becomes difficult.

The present invention takes into consideration the above situation, with the object of providing for further miniaturization of laser scanning systems and laser adapted equipment using such laser scanning systems, by achieving miniaturization of the mirror galvanometer.

DISCLOSURE OF THE INVENTION

Accordingly, the mirror galvanometer of the present invention comprises; a semiconductor substrate having a planar movable plate and a torsion bar for axially supporting the movable plate so as to be swingable in a perpendicular direction relative to the semiconductor substrate formed integrally therewith, a planar coil for generating a magnetic field by means of an electric current, laid on an upper face peripheral edge portion of the movable plate, and a reflecting mirror provided on an upper face central portion which is surrounded by the planar coil, and magnets forming pairs with each other arranged so as to produce a magnetic field at the planar coil portions on the opposite sides of the movable plate which are parallel with the axis of the torsion bar.

With such a construction, since the movable mirror portion is formed on the semiconductor substrate using a semiconductor element manufacturing process, then the mirror galvanometer can be made much smaller than conventional mirror galvanometer, thereby enabling miniaturization of laser scanning systems which deflection scan a laser beam.

The movable plate may comprise; a frame shape outer movable plate axially supported relative to the semiconductor substrate by a first torsion bar, and an inner movable plate axially supported inside the outer movable plate by a second torsion bar axially perpendicular to the first torsion bar, with a planar coil provided on an upper face of the outer movable plate, and a planar coil provided on an upper face peripheral edge portion of the inner movable plate, and the reflecting mirror provided on a central portion of the inner movable plate which is surrounded by the planar coil.

With such a construction wherein the inner and outer movable plates are axially supported by torsion bars arranged perpendicular to each other, laser beam deflection scanning can be carried out in two dimensions.

The construction may also be such that an upper substrate and a lower substrate are respectively provided on upper and lower faces of the semiconductor substrate, and the magnets are fixed to the upper substrate and the lower substrate.

Moreover, the construction may be such that a movable plate accommodating space, is tightly sealed by means of the upper substrate and the lower substrate, and evacuated. The swinging resistance on the movable plate due to air can thus be eliminated, enabling an increase in the swing amplitude of the movable plate.

In this case, the movable plate accommodating space may be formed by providing a recess in a central portion of the upper and lower substrates. A step in processing the semiconductor substrate to ensure a movable plate accommodating space in which the movable plate can swing freely can thus be omitted.

The upper and lower substrates may be insulating substrates.

Moreover, the magnets may be permanent magnets.

Furthermore, the planar type mirror galvanometer according to the present invention may comprise; a semiconductor substrate having a planar movable plate and a torsion bar for axially supporting the movable plate so as to be swingable in a perpendicular direction relative to the semiconductor substrate formed integrally therewith, a permanent magnet provided on at least an upper face peripheral edge portion of the movable plate, and a reflecting mirror provided on an upper face central portion of the movable plate, and a planar coil for generating a magnetic field by means of an electric current, provided on semiconductor portions beside the opposite sides of the movable plate which are parallel with the axis of the torsion bar.

If the planar coil is formed on the semiconductor substrate in this way, then it is not necessary to consider influence of heating of the planar coil by the electrical current.

Moreover, if the permanent magnet is made as a thin film, then there will be minimal influence on the swinging operation of the movable plate. Also, since the permanent magnet can be integrally formed by semiconductor manufacturing techniques, then the step of fitting the permanent magnet can be eliminated, thus simplifying construction of the mirror galvanometer.

In this case also the construction may be such that the movable plate comprises; a frame shape outer movable plate axially supported relative to the semiconductor substrate by a first torsion bar, and an inner movable plate axially supported inside the outer movable plate by a second torsion bar axially perpendicular to the first torsion bar, with a permanent magnet provided on at least an upper face peripheral edge portion of the inner movable plate, and the reflecting mirror provided on a central portion of the inner movable plate.

Moreover, the movable plate accommodating space may be tightly sealed by means of the upper substrate and lower substrate and evacuated.

The upper and lower substrates may be insulating substrates.

A method of manufacturing a mirror galvanometer according to an aspect of the present invention includes; a step of piercing a semiconductor substrate excluding a portion forming a torsion bar, by anisotropic etching from the substrate lower face to the upper face to form a movable plate which is axially supported on the semiconductor substrate by the torsion bar portion so as to be swingable, a step of forming a planar coil on the upper face periphery of the movable plate by electroplating, a step of forming a reflecting mirror on a central portion of the movable plate which is surrounded by the planar coil by vapor deposition of aluminum, a step of fixing an upper substrate and a lower substrate to upper and lower faces of the semiconductor substrate by anodic splicing, and a step of fixing magnets to upper and lower substrate portions which correspond to the opposite edges of the movable plate which are parallel with the axis of the torsion bar.

A method of manufacturing a mirror galvanometer according to another aspect of the present invention includes; a step of piercing a semiconductor substrate excluding a portion forming a torsion bar, by anisotropic etching from the substrate lower face to the upper face to form a movable plate which is axially supported on the semiconductor substrate by the torsion bar so as to be swingable, a step of forming a thin film permanent magnet on the upper face of the movable plate, a step of forming a reflecting mirror on a central portion of the movable plate by vapor deposition of aluminum, a step of forming a planar coil on semiconductor substrate portions beside the opposite edges of the movable plate which are parallel with the axis of said torsion bar by electroplating, and a step of fixing an upper substrate and a lower substrate to upper and lower faces of the semiconductor substrate by anodic splicing.

With these methods of manufacturing the respective mirror galvanometers, the step of forming the planar coil may involve an coil electro-typing method. More specifically, this may involve forming a nickel layer on the semiconductor substrate by sputtering, then forming a copper layer on the nickel layer by electroplating or sputtering. Subsequently masking the portion corresponding to the planar coil portion and carrying out successive copper etching and nickel etching. Then removing the mask, and copper electroplating over the coil pattern.

If the planar coil is formed using the above methods, it is possible to lay a thin film coil with a low resistance at a high density.

BEST MODE FOR CARRYING OUT THE INVENTION

Embodiments of the present invention will now be described with reference to the figures.

Figure 1:
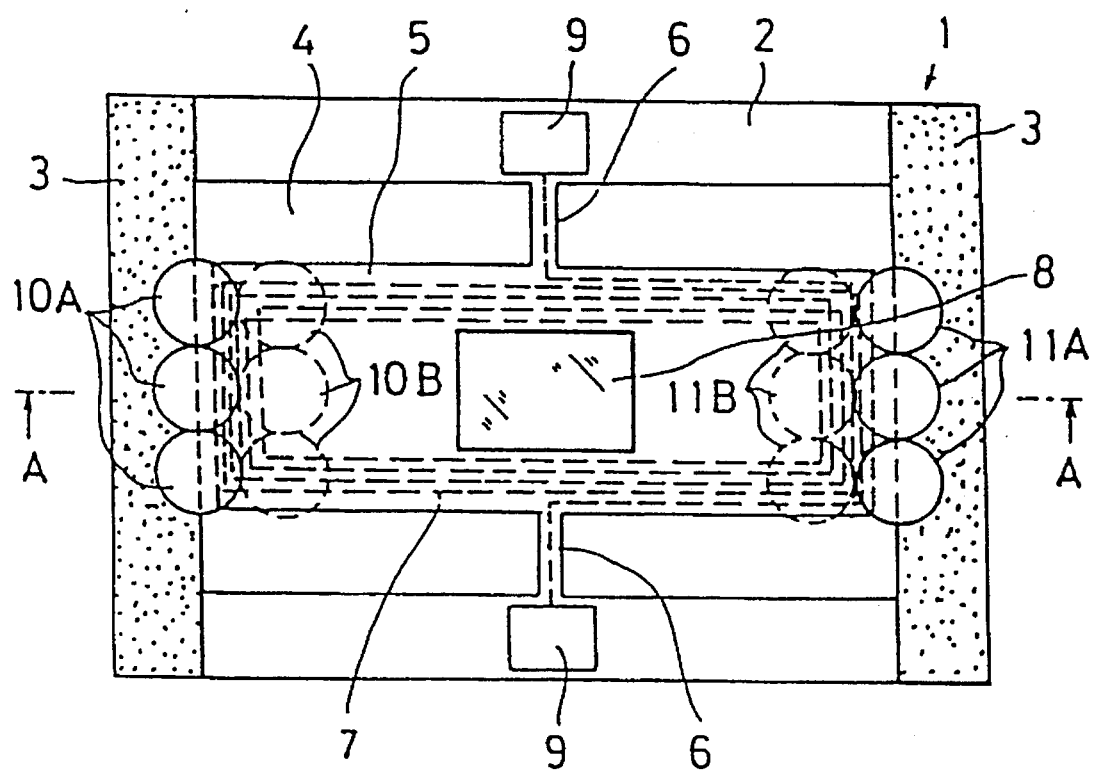
FIG. 1 is a schematic diagram showing the construction of a first embodiment of a mirror galvanometer according to the present invention.
Figure 2:
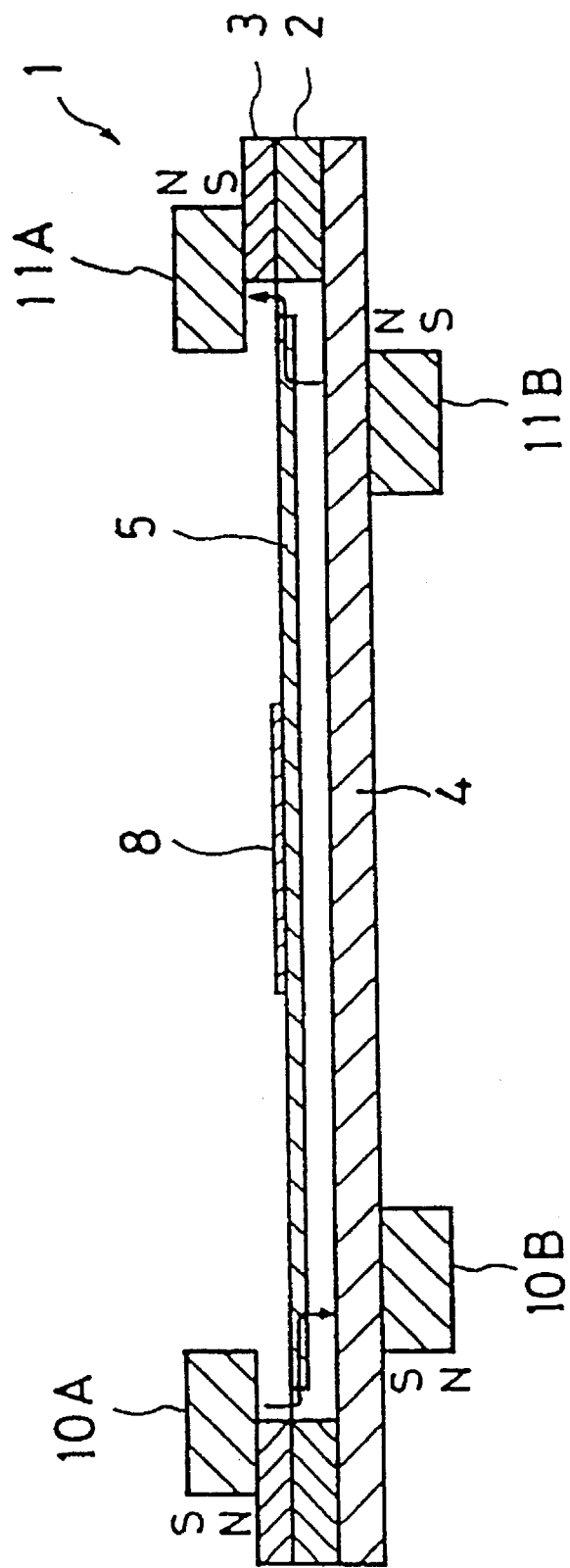
FIG. 2 is a cross sectional view in the direction of arrows A—A of FIG. 1.

FIGS. 1 and 2 show the construction of a first embodiment of a mirror galvanometer according to the present invention for a single axis arrangement.

In FIGS. 1 and 2, a mirror galvanometer 1 has a triple layer construction with respective upper and lower glass substrates 3, 4 (upper and lower insulating substrates) made for example from borosilicate glass and the like, anodic spliced to upper and lower faces of a silicon substrate 2 (semiconductor substrate). The upper glass substrate 3 is laminated onto left and right edges (in FIG. 1) of the silicon substrate 2 so as to leave the area above a movable plate 5 discussed later open.

The planar movable plate 5, and torsion bars 6, 6 for axially supporting the movable plate 5 at a central location thereof so as to be swingable in a perpendicular direction relative to the silicon substrate 2, are formed integrally with the silicon substrate 2 by anisotropic etching. The movable plate 5 and the torsion bars 6, 6 are therefore both made from the same material as the silicon substrate 2. A planar coil 7 made from a thin copper film, for generating a magnetic field by means of an electrical current, is provided on the upper face peripheral edge portion of the movable plate 5 and covered with an insulating film. Here if the coil is laid at a high density as a high resistance thin film coil having a Joule heat loss due to the resistance, the drive force will be limited due to heating. Therefore, with the present embodiment, the planar coil 7 is formed by a heretofore known coil electro-typing method using electroplating. The coil electro-typing method has the characteristic that a thin film coil can be mounted with low resistance and at a high density, and is effective in the miniaturization and slimming of micro-magnetic devices. It involves forming a thin nickel layer on the semiconductor substrate by sputtering, then forming a copper layer on the nickel layer by electroplating or sputtering. Subsequently removing the copper layer and nickel layer except at the portions corresponding to the coil. Then copper electroplating over the coil pattern to form a thin film planar coil. A total reflecting mirror 8 is formed as a reflecting mirror on an upper face central portion of the movable plate 5 which is surrounded by the planar coil 7, by vapor deposition of aluminum. Moreover, a pair of electrode terminals 9, 9 electrically connected to the planar coil 7 by way of portions of the torsion bars 6, 6 are provided on the upper face of the silicon substrate 2 beside the torsion bars 6, 6. The electrode terminals 9, 9 are formed on the silicon substrate 2 at the same time as forming the planar coil 7, by the coil electro-typing method.

Cylindrical shaped permanent magnets 10A, 10B and 11A, 11B, are provided in pairs on the left and right sides (in the figures) of the upper and lower glass substrates 3, 4, so as to produce a magnetic field at the planar coil 7 portions on the opposite sides of the movable plate 5 which are parallel with the axis of the torsion bars 6, 6. One of the pairs of three permanent magnets 10A, 10B, is arranged as shown in FIG. 2 with the lower side the north pole and the upper side the south pole, while the other of the pairs of three permanent magnets 10A, 11B, are arranged as shown in FIG. 2 with the lower side the south pole and the upper side the north pole.

The operation will now be described.

Figure 3:
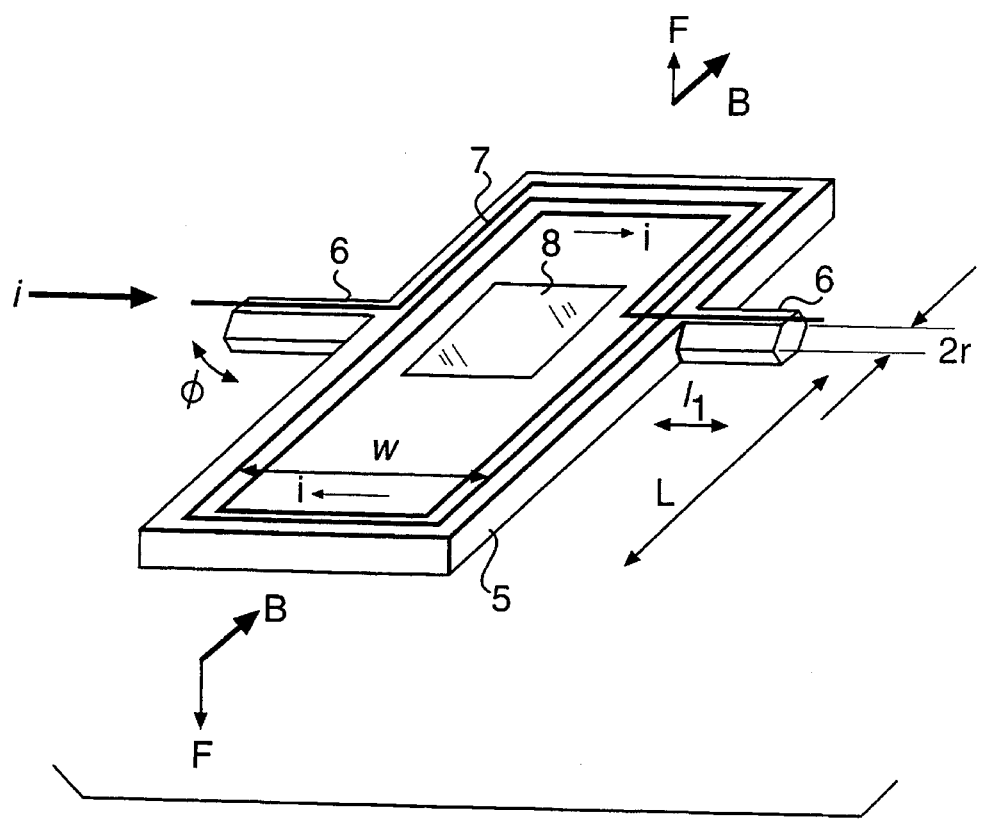
FIG. 3 is a diagram for explaining the operating theory of the mirror galvanometer of the present invention.

As shown for example in FIG. 3, a current is produced in the planar coil 7 with one of the electrical terminals 9 as a positive terminal and the other as a negative terminal. A magnetic field at both edges of the movable plate 5 produced by means of the permanent magnets 10A and 10B and 11A and 11B follows along planar faces of the movable plate 5 as shown by the arrow in FIG. 2, between the upper and lower magnets, in a direction so as to intersect the planar coil 7. When a current flows in the planar coil 7 disposed within this magnetic field, a magnetic force F which can be determined from the Lorentz's force, acts on the planar coil 7, in other words on the opposite ends of the movable plate 5, in a direction (as shown in FIG. 3) according to Fleming's left hand rule for current, magnetic flux density and force, depending on the current density and the magnetic flux density of the planar coil 7.

This magnetic force F can be determined from the following equation (1):

$$F = i \times B \tag{1}$$

where i is the current density flowing in the planar coil 7, and B is the magnetic flux density due to the permanent magnets 10A, 10B and 11A, 11B:

In practice, this force differs due to the number of windings n of the planar coil 7 and the coil length w (as shown in FIG. 3) over which the force F acts, so that the following equation (2) applies;

$$F = nw(i \times B) \tag{2}$$

The relationship between the displacement angle $\phi$ of the movable plate 5 and the resultant spring reactive force F' of the torsion bars 6, 6 when twisted with rotation of the movable plate 5, is given by the following equation (3):

$$\begin{aligned} \phi &= (Mx/GIp) \\ &= (FL/8.5 \times 10^9 \, r^4) \times l_1 \end{aligned} \tag{3}$$

where Mx is the torsional moment, G is the modulus of longitudinal elasticity, and Ip is the polar moment of inertia of area. Moreover, L, $l_1$ and r are respectively, the distance from the torsion bar central axis to the load point, the torsion bar length, and the torsion bar radius as shown in FIG. 3.

The movable plate 5 rotates to a position wherein the magnetic force F is in equilibrium with the spring reactive force F'. Therefore, substituting F of equation 2 for F' in equation 3 shows that the displacement angle $\phi$ of the movable plate 5 is proportional to the current i flowing in the planar coil 7.

Since the displacement angle $\phi$ of the movable plate 5 can be controlled by controlling the current flowing in the planar coil 7, it thus becomes possible to freely control for example, the reflection direction of a laser beam incident on the total reflecting mirror 8, in a plane perpendicular to the axis of the torsion bars 6, 6. Therefore if the deflection angle of the total reflecting mirror 8 is continuously changed back and forth, laser beam scanning can be achieved.

Computation results of magnetic flux density distribution due to the permanent magnets will now be described.

Figure 4:
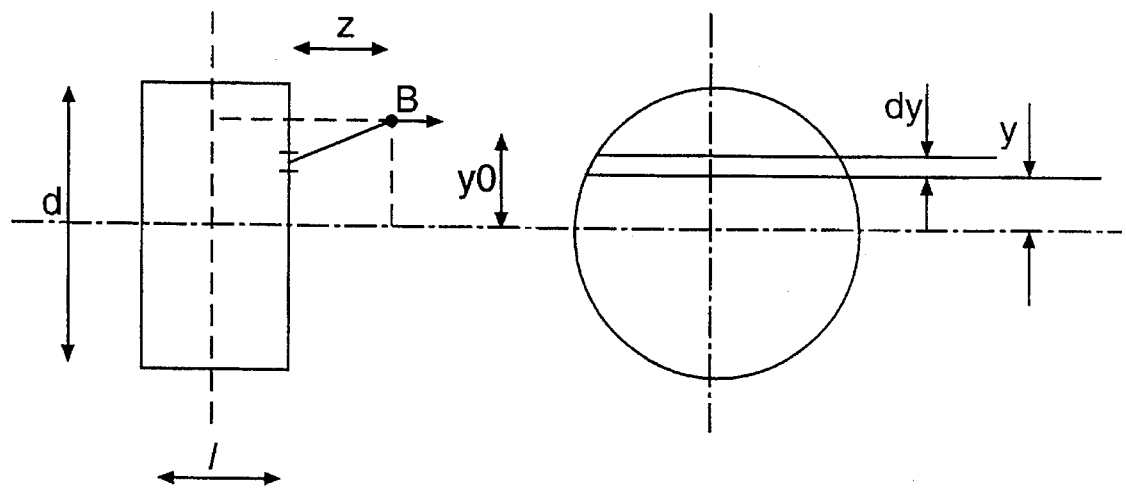
FIG. 4 is a computational model diagram for computing magnetic flux density distribution due to a permanent magnet of the first embodiment.

FIG. 4 shows a magnetic flux density distribution computation model for the cylindrical shaped permanent magnet used in the present embodiment. Respective north and south pole faces of the permanent magnets are divided up into very small regions dy, and the magnet flux for the resultant points computed.

If the magnetic flux density produced at the north pole face is Bn and the magnetic flux density produced at the south pole face is Bs, the magnetic flux densities Bn, Bs can be obtained from the computational formula for the magnetic flux density distribution of a cylindrical shaped permanent magnet, according to equations (4) and (5). The magnetic flux density B at an optional point becomes the sum of Bn and Bs as given by equation (6):

$$Bn = \frac{Br}{2\pi} \int_{-d/2}^{d/2} \frac{z[(d/2)^2 - y^2]^{1/2} \, dy}{[(y-yo)^2 + z^2][(d/2)^2 + z^2 + yo^2 - 2yoy]^{1/2}} \tag{4}$$

-continued $$Bs = \frac{Br}{2\pi} \int_{-d/2}^{d/2} \frac{(z+1)[(d/2)^2 - y^2]^{1/2} dy}{[(y-yo)^2 + (z+1)^2][(d/2)^2 + (z+1)^2 + yo^2 - 2yoy]^{1/2}} \quad (5)$$

$$B = Bn + Bs \quad (6)$$

Here in the respective equations (4) and (5), Br is the residual magnetic flux density of the permanent magnet, y, z are coordinates at an optional point in space in the vicinity of the permanent magnet, I is the distance between the north and south pole faces of the permanent magnet, and d is the diameter of the polar faces.

Figure 5:
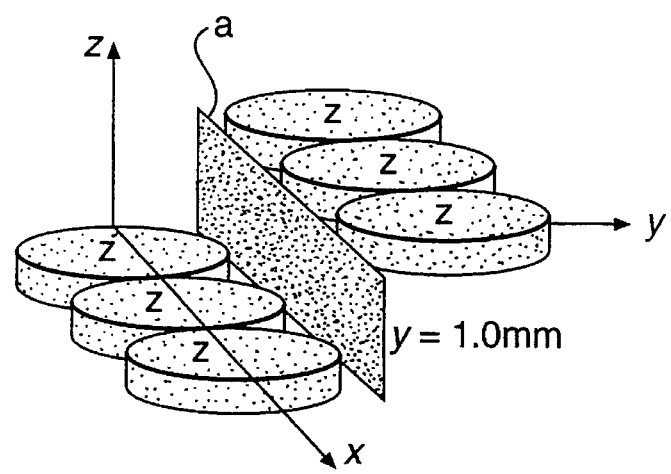
FIG. 5 is a diagram illustrating locations of the computed magnetic flux density distribution.
Figure 6:
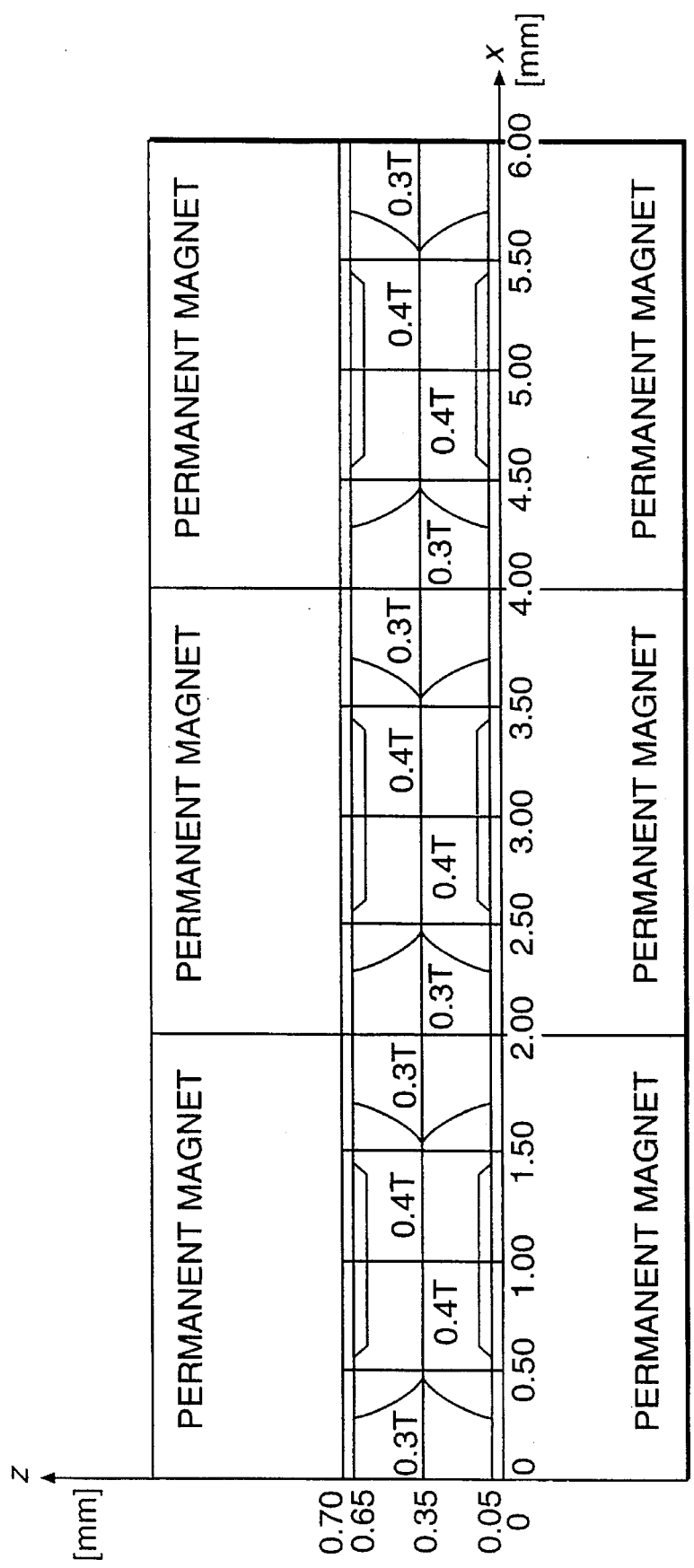
FIG. 6 is a diagram of computational results of magnetic flux density distribution at the locations shown in FIG. 5.

The computed results for the magnetic flux density distribution in a surface "a" arranged as shown in FIG. 5 perpendicular to the faces of the permanent magnets, are given in FIG. 6 for an example using a DIANET DM-18 (trade name; product of Seiko Electronics) Sm—CO permanent magnet of 1 mm radius, 1 mm thickness and a residual magnetic flux density of 0.85 T. In FIG. 5, x, y, z are coordinates at an optional point in space in the vicinity of the permanent magnet.

When arranged as shown in FIG. 5, the space between the permanent magnets has a magnetic flux density equal to or greater than 0.3 T.

The computational results for the displacement of the movable plate 5 will now be described.

These are obtained from equations (2) and (3), with the width of the planar coil 7 formed on the movable plate 5 as 100 μm and the number of windings as 14, the width of the movable plate 5 as 4 mm, the length as 5 mm, and the thickness as 20 μm, and the radius of the torsion bar 6 as 25 μm and the length as 1 mm. For the magnetic flux density, a value of 0.3 T obtained from the beforementioned magnetic flux density distribution computation was used.

Figure 7:
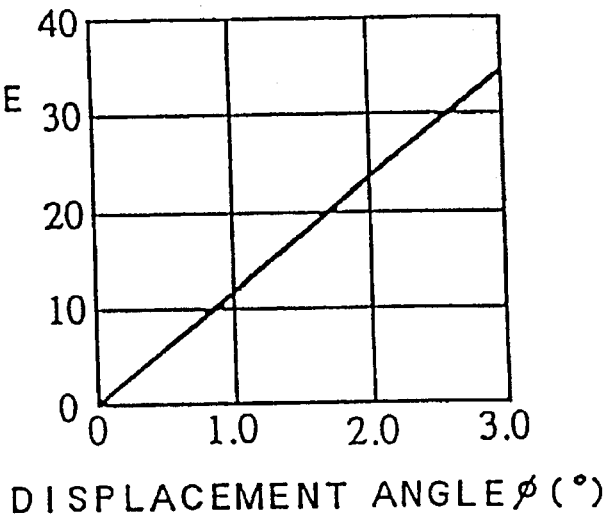
FIGS. 7(A)–7(C) show graphs of computational results for movable plate displacements and electrical current.
Figure 7:
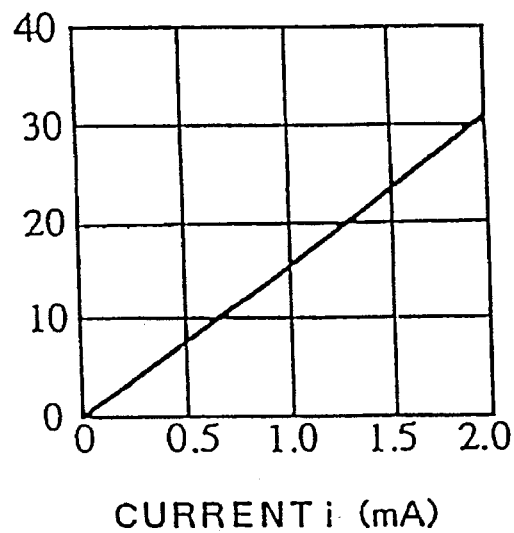
Figure 7:
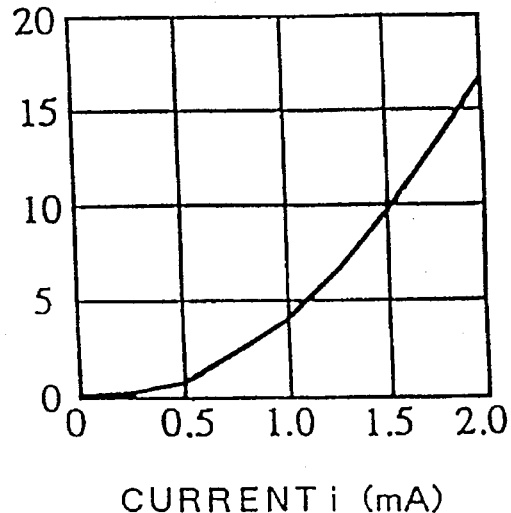

The result from graphs (A) and (B) of FIG. 7 shows that a current of 1.5 mA, gives a two degree displacement angle. FIG. 7 (C) shows the relationship between current and the amount of heat Q generated. The amount of heat generated per unit area at this time is 13 μwatt/cm².

The relationship between the amount of heat generated and the amount lost will now been explained.

The amount of heat generated is the Joule heat generated by the resistance of the coil. Therefore the amount of heat Q generated per unit time can be expressed by the following equation (7).

$$Q = i^2 R \quad (7)$$

where; i is the current flowing in the coil and R is the resistance of the coil. The amount of heat lost Qc due to heat convection can be expressed by the following equation (8).

$$Qc = hS\Delta T \quad (8)$$

where; h is the heat transfer coefficient ($5 \times 10^{-3} \sim 5 \times 10^{-2}$ watt/cm²°C. for air), S is the surface area of the element, and ΔT is the temperature difference between the element surface and the air.

If the surface area of the movable plate (heat generating portion) is 20 mm² (4×5 mm) then equation (8) gives;

$$Qc = 1.0 \Delta T (m\ watt/°C.) \quad (8)'$$

This shows that if the amount of heat generated is about several tens of watts/cm², problems with temperature rise of the element can be disregarded.

For a reference, the amount of heat lost Qr due to radiation can be expressed by the following equation (9)

$$Qr = \epsilon S \sigma T^4 \quad (9)$$

where; ε is the radiation factor (for a black body ε=1, while generally ε<1), S is the surface area of the element, σ is the Stefan-Boltzmann constant ($\pi^2 k^4/60 h^3 c^2$), and T is the element surface temperature.

The amount of heat lost Qa due to conduction from the torsion bar can be expressed by the following equation (10)

$$Qa = 2\lambda (S/l_1) \Delta T \quad (10)$$

where; λ is the thermal conductivity (84 watts/mK for silicon), S is the cross sectional area of the torsion bar, $l_1$ is the length of the torsion bar, ΔT is the temperature difference between the ends of the torsion bar. If the radius of the torsion bar is 25 μm and the length is 1 mm, then equation (10) gives;

$$Qa = 0.1 \Delta T (m\ watt/°C.) \quad (10)'$$

The bending of the torsion bar due to the weight of the movable plate, and the bending of the movable plate due to the electromagnetic force will now be explained.

Figure 8:
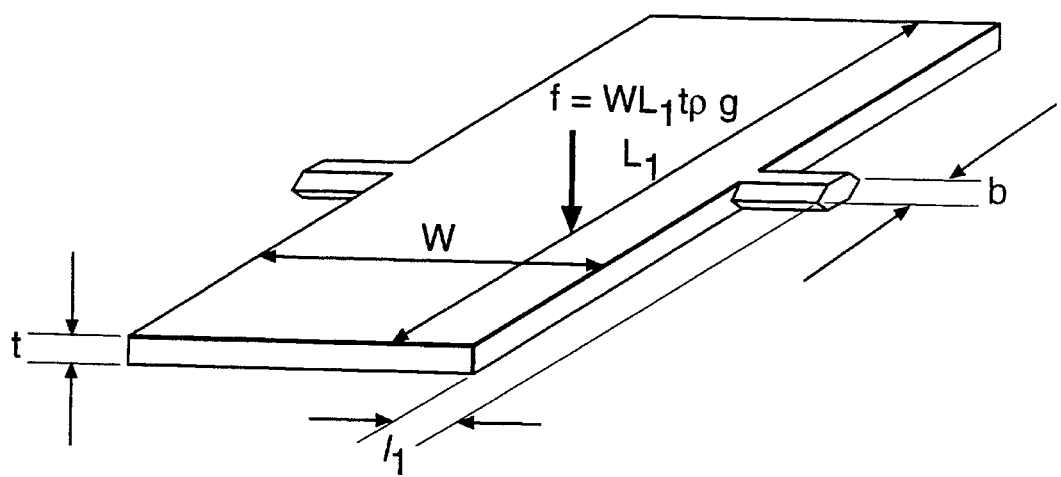
FIG. 8 is a computational model diagram for computing deflection of the torsion bar and movable plate.

FIG. 8 shows a computational model for this. With a torsion bar length of $l_1$, a torsion bar width of b, a movable plate weight of f, a movable plate thickness of t, a movable plate width of W, and a movable plate length of $L_1$, then using the computational method for the bending of a cantilever, the bending ΔY of the torsion bar is given by the following equation (11):

$$\Delta Y = (1/2)(4 l_1^3 f/Ebt^3) \quad (11)$$

where; E is the Young's modulus for silicon.

The weight f of the movable plate is given by the following equation (12):

$$f = W L_1 t \rho g \quad (12)$$

where; ρ is the volumetric density and g is the gravitational acceleration.

The bending ΔX of the movable plate, using the same computational method for the bending of a cantilever beam, is given by the following equation (13):

$$\Delta X = 4(L^1/2)^3 F/EWt^3 \quad (13)$$

where; F is the magnetic force acting on the edge of the movable plate. The magnetic force F is obtained by assuming the coil length w in equation (2) to be the width W of the movable plate.

The computational results for the bending of the torsion bar and the bending of the movable plate are given in Table 1. The bending of the movable plate is calculated for a magnetic force F of 30 μN.

TABLE 1

Computational Results for the Bending of the Torsion Bar and Movable Plate

| | | | |
|---|---|---|---|
| W | 6 mm | 6 mm | 6 mm |
| $L_1$ | 13 mm | 13 mm | 13 mm |
| t | 50 μm | 50 μm | 100 μm |
| b | 50 μm | 50 μm | 50 μm |
| $l_1$ | 0.5 mm | 1.0 mm | 1.0 mm |
| f | 89 μN | 89 μN | 178 μN |
| ΔY | 0.022 μm | 0.178 μm | 0.356 μm |
| ΔX | 0.125 μm | 0.125 μm | 0.016 μm |

As can be seen from Table 1, with a torsion bar of width 50 μm and length 1 mm, the bending ΔY due to a movable plate of width 6 mm, length 13 mm, and thickness 50 μm is 0.178 μm. If the thickness of the movable plate is doubled to 100 μm, then the bending ΔY is only 0.356 μm. Furthermore, with a movable plate of width 6 mm, length 13 mm, and thickness 50 μm, the bending ΔX due to magnetic force is only 0.125 μm. If the amount of displacement at opposite ends of the movable plate during operation is around 200 μm, then this small amount will have no influence on the characteristics of the mirror galvanometer of the present embodiment.

As described above, with the mirror galvanometer of the present embodiment, influence due to heat generated by the coil can also be disregarded. Moreover, since the swing characteristics of the movable plate 5 present no problems, functions the same as with conventional devices can be realized. Furthermore, by using a semiconductor element manufacturing process, then an ultra small slimmodel mirror galvanometer can be made. Consequently, an even further reduction in size becomes possible for laser beam scanning systems using a mirror galvanometer, enabling an even further size reduction in laser adapted equipment which use such scanning systems. Additionally, through using a semiconductor element manufacturing process, mass production becomes possible.

With the present embodiment, a permanent magnet is used to produce the magnetic field, however an electromagnet may also be used. Furthermore, while the construction involves a glass substrate provided above and below the silicon substrate for fixing the magnets, if the magnets can be fixed at a predetermined location, the glass substrate becomes unnecessary.

Figure 9:
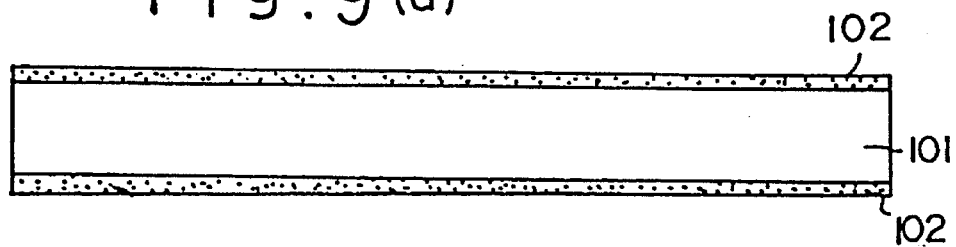
FIGS. 9(a)–(l) are diagrams for explaining the manufacturing steps of the first embodiment.
Figure 9:
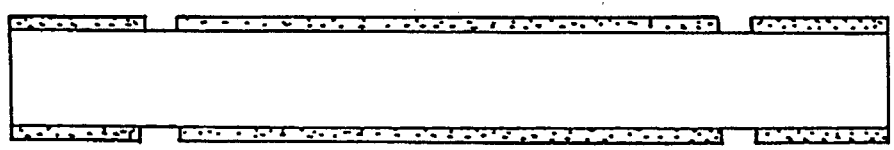
Figure 9:
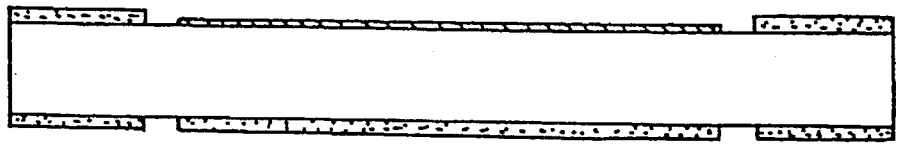
Figure 9:
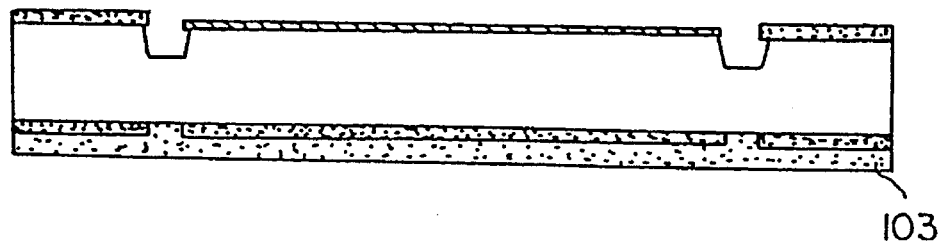
Figure 9:
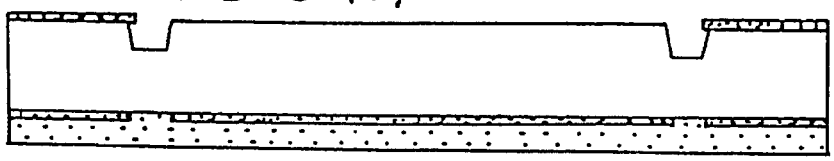
Figure 9:
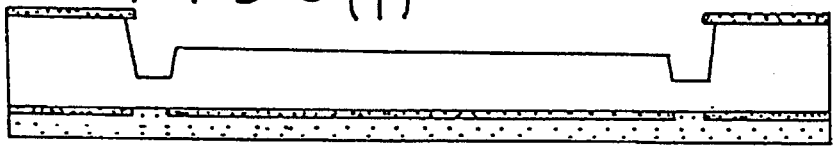
Figure 9:
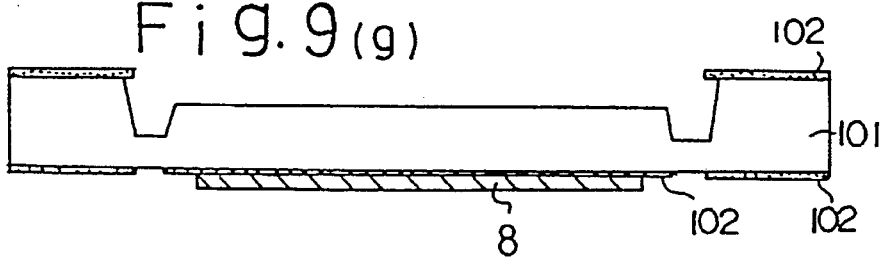
Figure 9:
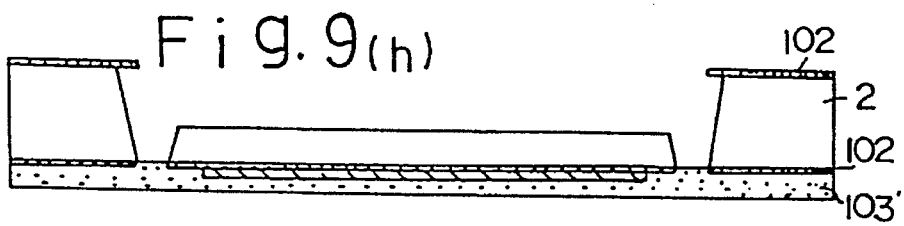
Figure 9:
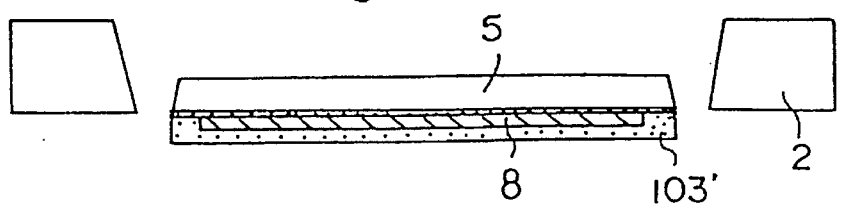
Figure 9:
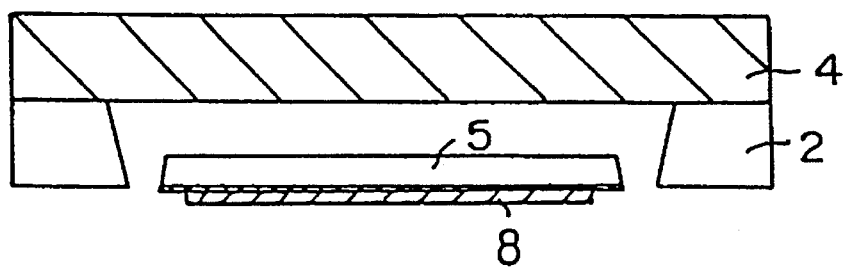
Figure 9:
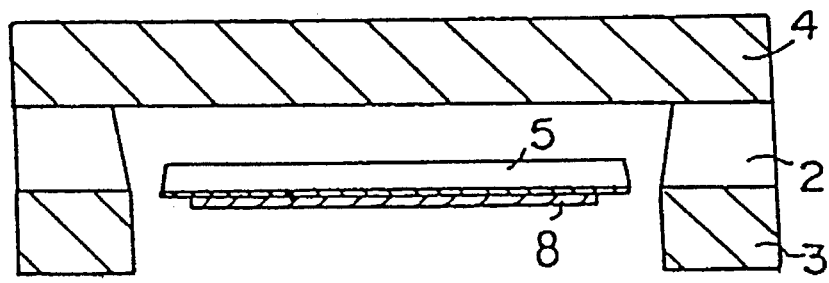
Figure 9:
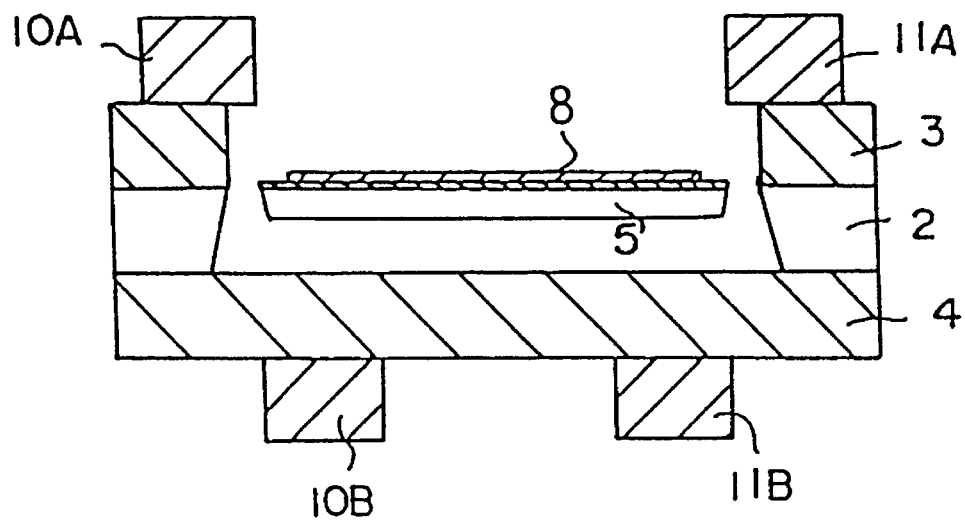

The steps in the manufacture of the mirror galvanometer according to the first embodiment will now be described with reference to FIG. 9.

The upper and lower faces of a 300 μm thick silicon substrate 101 are first thermally oxidized to form an oxide film (1 μm) 102 (see figure (a)).

A cut-out pattern is then formed on the front and rear faces by photolithography, and the oxide film in the cut-out portion removed by etching (see figure (b)). After this, the oxide film on the portion forming the movable plate is removed down to a thickness of 0.5 μm (see figure (c)).

A wax layer 103 is then applied to the from face (lower face in FIG. 9), and anisotropic etching carried out on the rear surface cut-out portion by 100 microns (see figure (d)).

After this, the thin oxide film on the movable plate portion on the rear face is removed (see figure (e)), and anisotropic etching carried out on the cut-out portion, and the movable plate portion by 100 microns (see figure (f)).

The wax layer 103 on the front face is then removed, and the planar coil and the electrode terminal portions (not shown in the figure) are formed on the front face oxide film 102 by a conventional electro-typing method for coils. Additionally, a total reflecting mirror 8 is formed by aluminum vapor deposition (see figure (g)). The electro-typing method for coils involves forming a nickel layer on the front face of the silicon substrate 101 by nickel sputtering, then forming a copper layer by electroplating or sputtering. The portions corresponding to the planar coil and the electrode terminals are then masked with a positive type resist, and copper etching and nickel etching successively carried out, after which the resist is removed. Copper electroplating is then carried out so that the whole peripheral edge of the nickel layer is covered with copper, thus forming a copper layer corresponding to the planar coil and the electrode terminals. After this, a negative type plating resist is coated on the areas except the copper layer, and copper electroplating carried out to thicken the copper layer to form-the planar coil and the electrode terminals. The planar coil portion is then covered with an insulating layer of for example a photosensitive polyimide and the like. When the planar coil is in two layers, the process can be repeated again from the nickel sputtering step to the step of forming the insulating layer.

A wax layer 103' is then provided on the front surface, and anisotropic etching carried out on the cut-out and movable plate portions by 100 microns to cut through the cut-out portion. The wax layer 103' is then removed except for on the movable plate portion. At this time, the upper and lower oxide films 102 are also removed. In this way, the movable plate 5 and the torsion bar (not shown in the figure) are formed, thus forming the silicon substrate 2 of FIG. 1 (see figures (h) and (i)).

The wax layer 103' on the movable plate portion is then removed, and the lower glass substrate 4 and the upper glass substrate 3 respectively joined in sequence to the upper and lower faces of the silicon substrate 2 by anodic splicing (see figures (j) and (k)).

Finally the permanent magnets 10A, 10B and 11A, 11B are mounted at predetermined locations on the upper and lower glass substrates 3, 4 (see figure (l).

Figure 10:
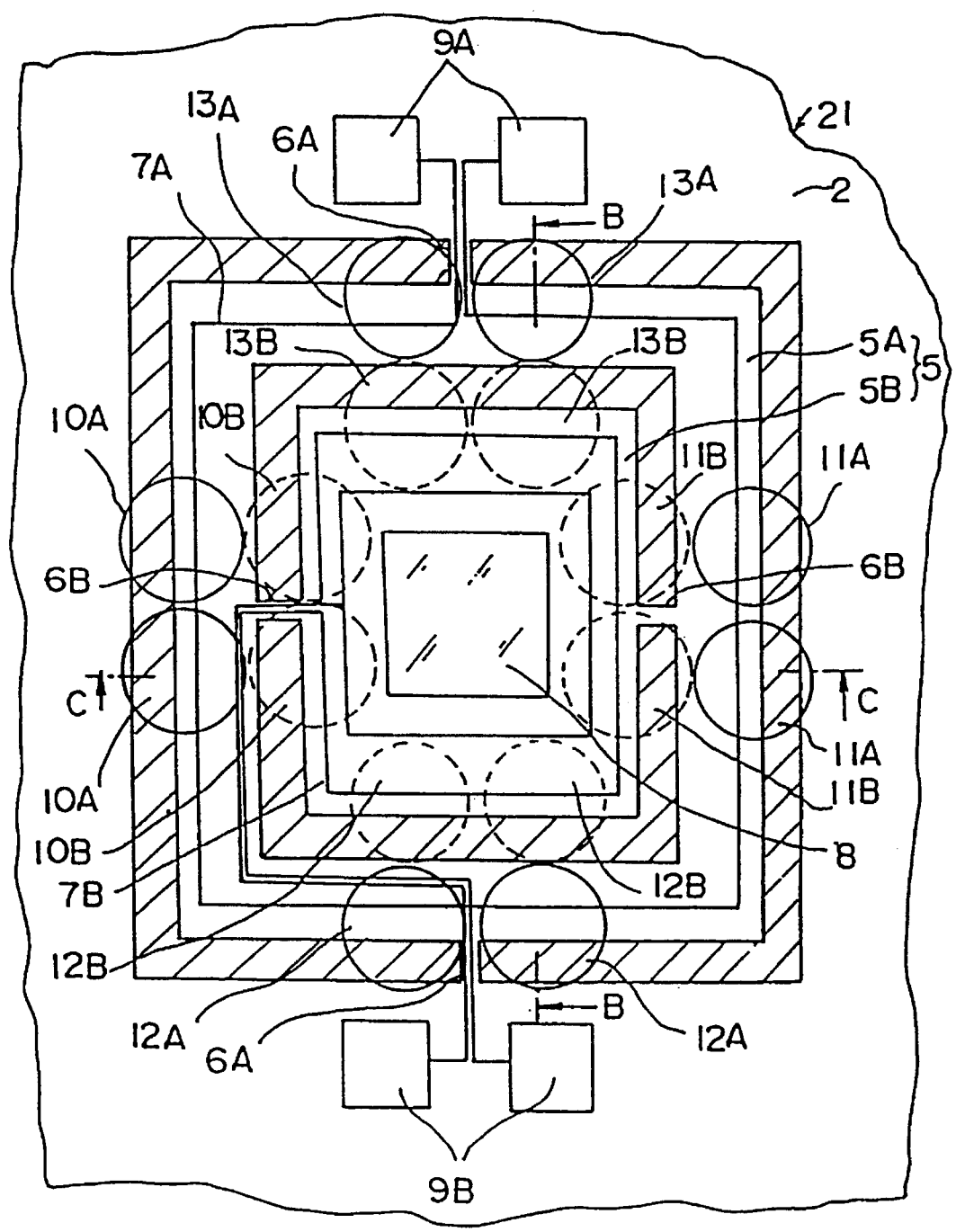
FIG. 10 is a plan view showing the construction of a second embodiment of a mirror galvanometer according to the present invention.

A constructional example of a 2 axis mirror galvanometer according to a second embodiment of the present invention will now be described with reference to FIGS. 10–FIG. 12. Elements the same as in the first embodiment are indicated with the same symbol and description is omitted.

As shown in the figures, with a mirror galvanometer 21 of this embodiment, the movable plate 5 of the silicon substrate 2 comprises an outer movable plate 5A and a planar inner movable plate 5B axially supported inside the outer movable plate 5A. The outer movable plate 5A is formed in a frame shape and is axially supported on the silicon substrate 2 by first torsion bars 6A, 6A. A planar coil 7A (shown typically as a single line in FIG. 10) covered with an insulating layer, is provided on an upper face of the outer movable plate 5A, electrically connected to a pair of outer electrode terminals 9A, 9A formed on the upper face of the silicon substrate 2, by way of part of one of the first torsion bars 6A, 6A. The inner movable plate 5B is axially supported inside the outer movable plate 5A by second torsion bars 6B, 6B which are axially perpendicular to the first torsion bars 6A, 6A. A planar coil 7B (shown typically as a single line in FIG. 10) covered with an insulating layer, is provided on the upper face of the inner movable plate 5B, electrically connected to a pair of inner electrode terminals 9B, 9B formed on the upper face of the silicon substrate 2, by way of the other of the first torsion bars 6A, 6A, passing from one of the second torsion bars 6B, 6B via the outer movable plate 5A portion. Moreover, a total reflecting mirror 8 is formed on the central portion of the inner movable plate 5B which is surrounded by the planar coil 7B.

Figure 11:
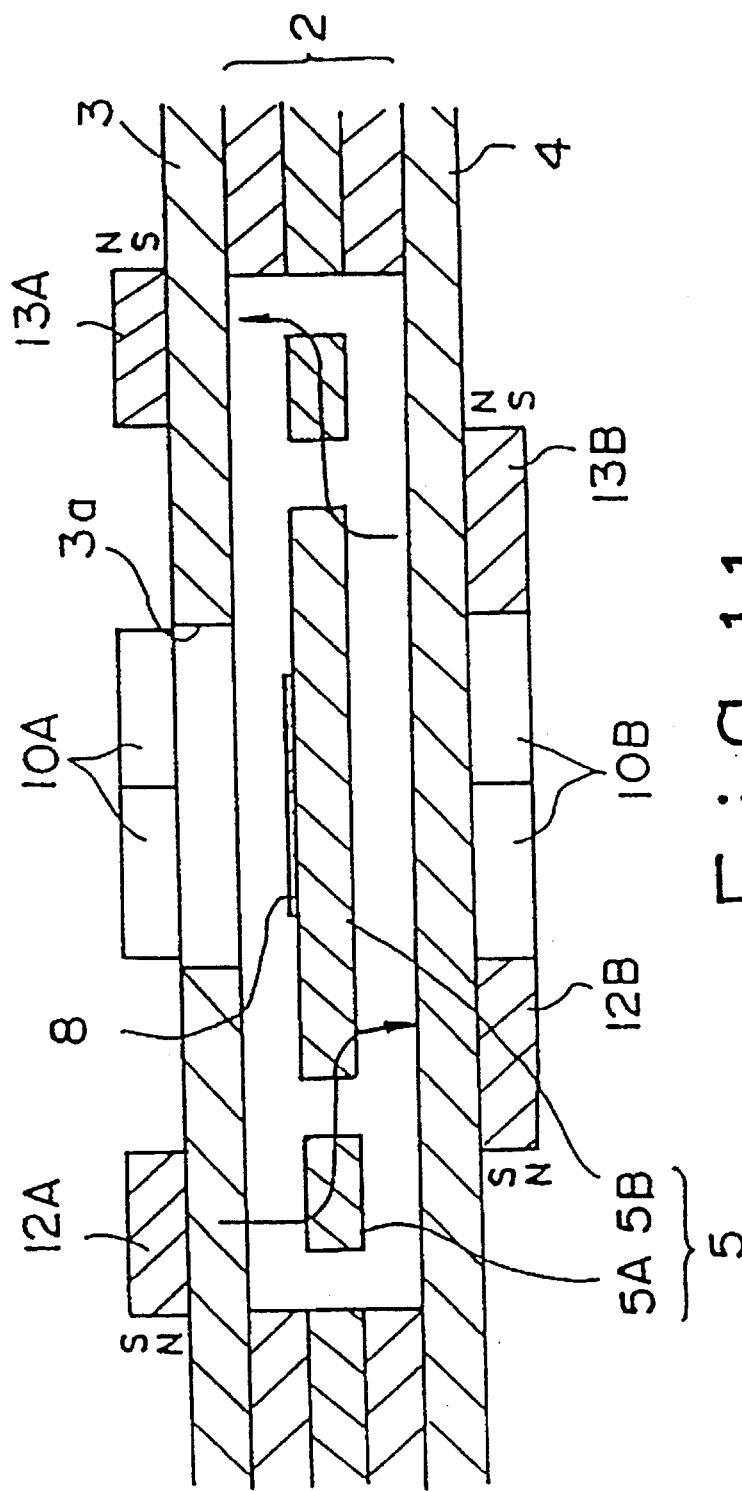
FIG. 11 is a cross sectional view in the direction of arrows B—B of FIG. 10.
Figure 12:
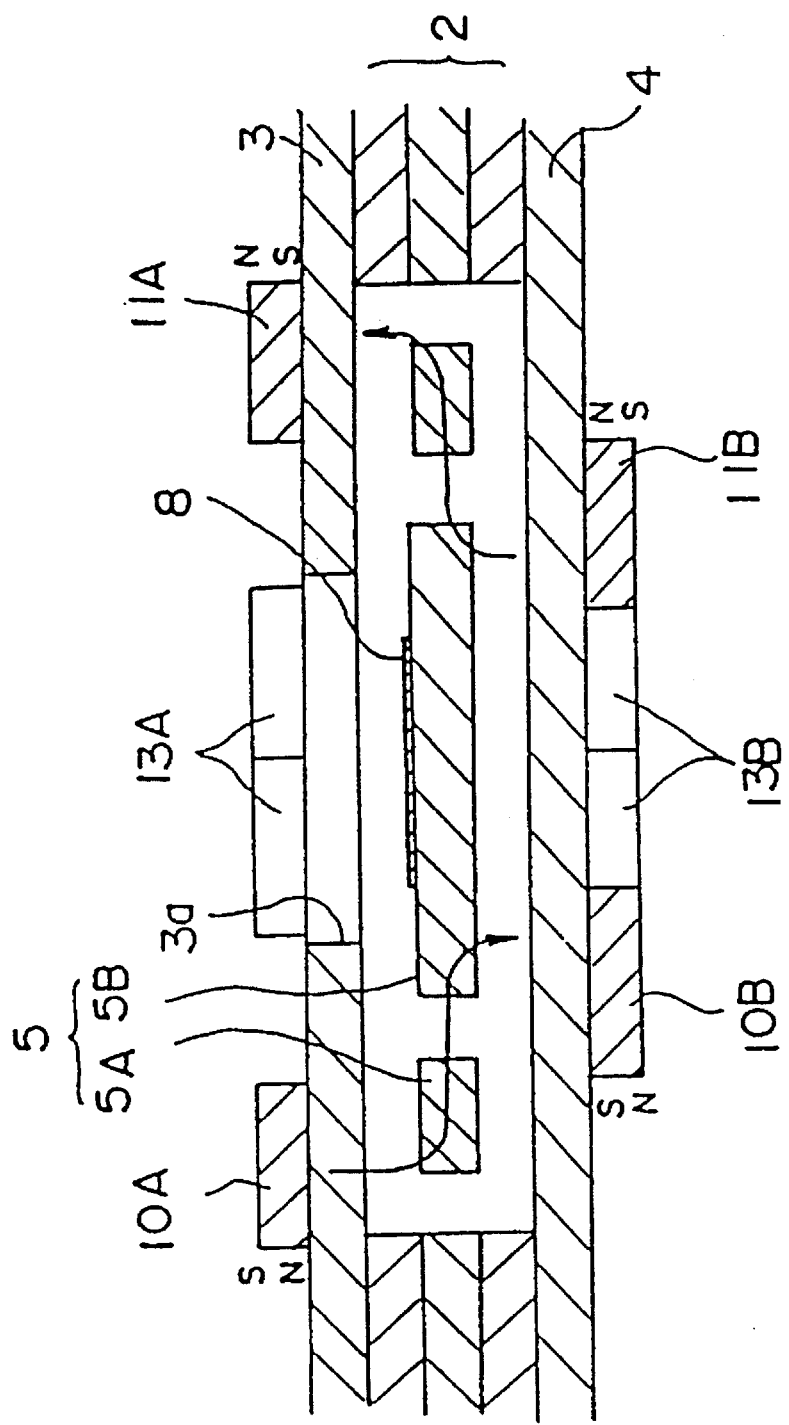
FIG. 12 is a cross sectional view in the direction of arrows C—C of FIG. 10.

Upper and lower glass substrates 3, 4 made from for example borosilicate glass or the like, are respectively anodic spliced to upper and lower faces of the silicon substrate 2 as shown in FIG. 11 and FIG. 12. The upper glass substrate 3 of the present embodiment has a square shaped opening 3a formed centrally in a planar portion, leaving the area above the total reflecting mirror 8 open. The lower glass substrate 4 has a planar form as with the first embodiment. With regards to the silicon substrate 2, this is formed in three layers so as to maintain a swinging space for both movable plates 5A, 5B, with the movable plate portion formed in the central layer.

Eight pairs of cylindrical shaped permanent magnets 10A~13A, and 10B~13B are respectively located in twos on the upper and lower glass substrates 3, 4 as shown in the figures. The permanent magnets 10A, 11A, opposed to each other on the upper glass substrate 3, produce a magnetic field with the permanent magnets 10B, 11B on the lower glass substrate 4, for driving the outer movable plate 5A. Moreover, the permanent magnets 12A, 13A, opposed to each other on the upper glass substrate 3, produce a magnetic field with the permanent magnets 12B, 13B of the lower glass substrate 4, for driving the inner movable plate 5B. Instead of permanent magnets, electromagnets may be used.

With such a construction, if a current flows in only the planar coil 7A of the outer movable plate 5A, then the outer movable plate 5A moves corresponding to the current direction, with the first torsion bars 6A, 6A as the supporting point. At this time, the inner movable plate 5B also moves as one with the outer movable plate 5A. In this case, the total reflecting mirror 8 moves in the same manner as for the first embodiment. On the other hand, if a current flows in the planar coil 7A and also in the planar coil 7B of the inner movable plate 5B, the inner movable plate 5B rotates in a direction perpendicular to the rotation direction of the outer movable plate 5A, with the second torsion bars 6B, 6B as the supporting point. In this case, if a laser beam is deflection scanned with the total reflecting mirror 8, then scanning is carried out in two dimensions, thus giving an increase in the degrees of freedom of laser beam scanning compared to the single axis arrangement of the first embodiment.

Figure 13:
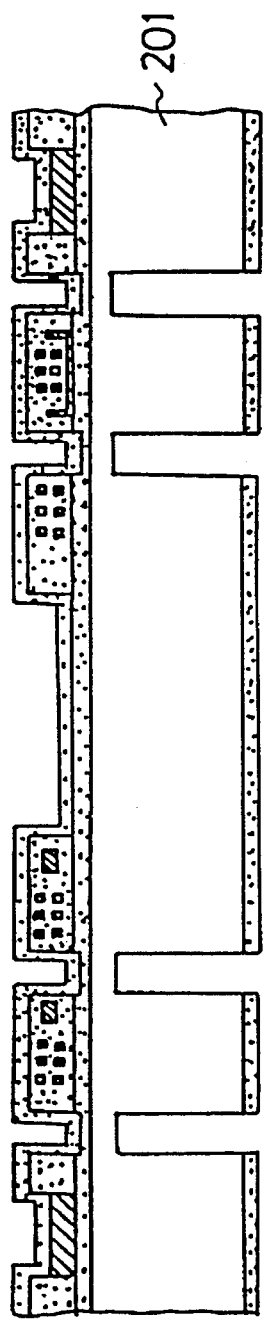
FIGS. 13(a)–(l) are diagrams for explaining the manufacturing steps of the second embodiment.
Figure 13:
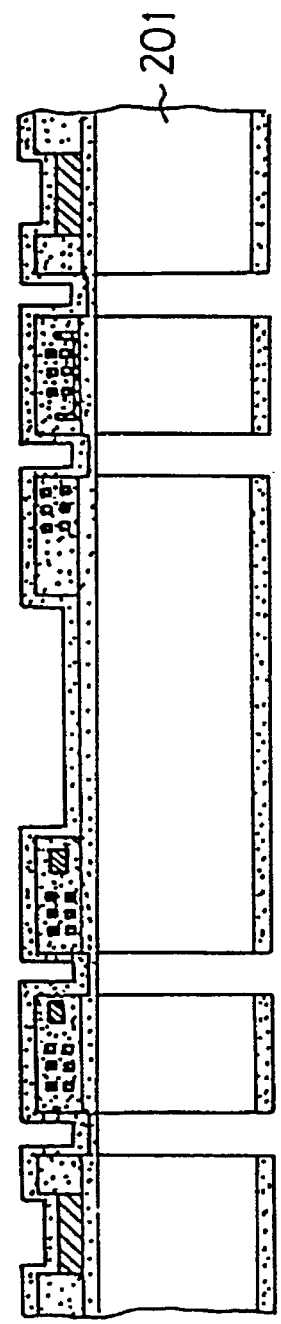
Figure 13:
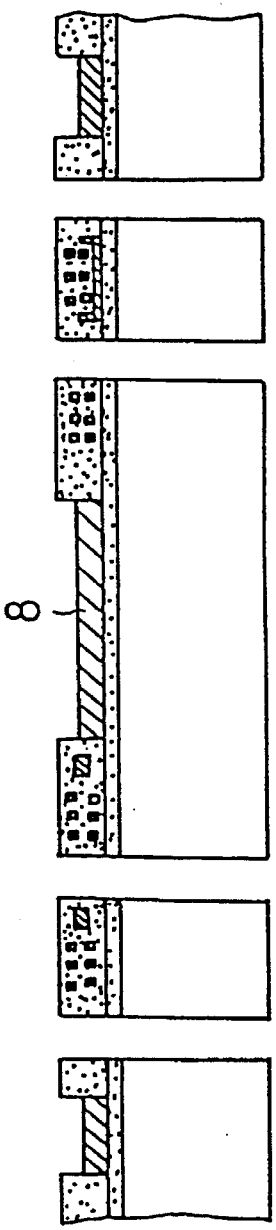

The steps in the manufacture for the mirror galvanometer according the second embodiment will now be described with reference to FIG. 13.

The upper and lower faces of a 200 μm thick silicon substrate 201 are first thermally oxidized to form an oxide film (0.5 μm) 202. A cut-out pattern is then formed on the front face (upper face in FIG. 13) by photolithography, and the oxide film in the cut-out portion removed by etching (see figure (a)).

After this, the front face is thermally oxidized, and a thin oxide film (0.1 μm) 202' is formed on the cut-out portion, while a cut-out pattern is formed on the rear face (lower face in FIG. 13) at a location corresponding to the pattern on the front face, by photolithography (see figure (b)).

Anisotropic etching is then carried out on the cut-out portion of the rear face by 170 μm (see to figure (c)).

Then nickel sputtering is carried out on the front face to form a nickel layer, followed by copper sputtering to form a copper layer. The portion corresponding to an intersection portion 203 where the planar coil on the inner movable plate and the planar coil on the outer movable plate intersect without contact, to connect to the electrode terminals, and the portions corresponding to the electrode terminals on the silicon substrate beside the movable plate 5, are then masked with a positive type resist, and copper etching and nickel etching successively carried out. In this way, the intersection portion 203 and the electrode terminals 204 are formed on the silicon substrate face, from a nickel layer and copper layer (see figure (d)).

A mask is then applied except to opposite edge portions of the intersection portion 203, and the electrode terminal 204 portion, to form an insulating layer 205 of a photosensitive polyimide and the like (see figure (e)).

The planar coils of the outer movable plate and the inner movable plate are then formed by the electro-typing method for coils. That is to say, a nickel layer is formed on the insulating layer 205 by nickel sputtering, and a copper layer then formed by electroplating or sputtering. The portions corresponding to the planar coil, the electrode terminals and the connection portions between the terminals and the coils are then masked with a positive type resist, and copper etching and nickel etching successively carried out, after which the resist is removed. Copper electroplating is then carried out so that the whole peripheral edge of the nickel layer is covered with copper, thus forming copper layers 206, 207 corresponding to the outer and inner planar coils. By means of this process, the planar coil portion is formed and at the same time the thickness of the electrode terminal portions 204 and the intersection portion 203 formed by the step shown in figure (d), can be increased (see figure (f)).

An insulating layer 205 is then formed by a similar process to that of figure (e) (see figure (g)). With this embodiment, in order to form the planar coils in two layers, then at the time of forming the insulating layer in the step shown in figure (g), the terminal portions 208, 209 for connecting to the upper and lower coils of both the inner and outer coils are masked so that an insulating layer is not formed.

Then in a similar manner to the step of figure (f), copper layers 210, 211 corresponding to an upper layer planar coils are formed. After this, the insulating layer 205 is formed. In this way, the planar coils 7A, 7B covered with an insulating layer are formed (see figures (i), (h)).

Silicon dioxide is then sputtered to form an oxide layer, and anisotropic etching carried out from the rear face to cut through the silicon substrate 201, thus forming the respective torsion bar portions and the inner and outer movable plate portions (see figures (j), (k)).

Then after etching to removing the silicon dioxide from the front face, the surface is masked except for the total reflecting mirror portion. The total reflecting mirror 8 is then formed by aluminum vapor deposition (see figure (l)).

Subsequently, as with the first embodiment, an upper glass substrate and a lower glass substrate are respectively joined to the upper and lower faces of the three layer silicon substrate by anodic splicing. Respective permanent magnets can then be mounted at predetermined locations on the upper and lower glass substrates.

A third embodiment will now be described with reference to FIG. 14. This mirror galvanometer is also a two axis type. Elements the same as in the embodiment shown in FIG. 10 are indicated with the same symbol and description is omitted.

Figure 14:
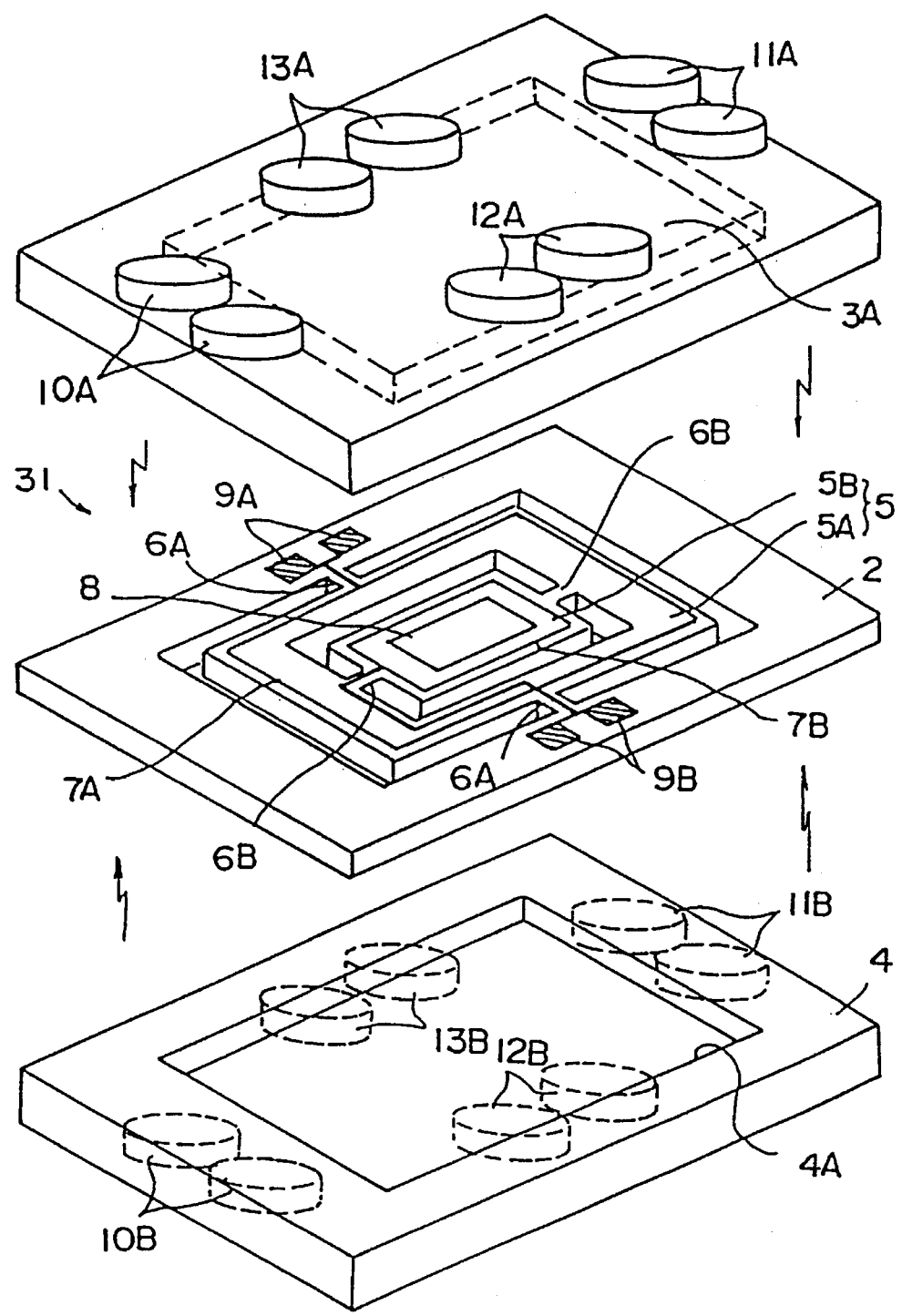
FIG. 14 is a perspective view showing the construction of a third embodiment of a mirror galvanometer according to the present invention.

In FIG. 14, with the mirror galvanometer 31 of this embodiment, the silicon substrate 2 has a single layer construction. The construction of the movable portions such as the movable plate 5 formed on the silicon substrate 2, is the same as shown in FIG. 10, and description is omitted.

With this embodiment, the upper glass substrate 3 and the lower glass substrate 4 which are anodic spliced to the upper and lower faces of the silicon substrate 2, are provided with recesses 3A, 4A formed in respective central portions as shown in FIG. 14, for example by ultrasonic machining. These are joined to the upper and lower faces of the silicon substrate 2 by anodic splicing, as shown by the arrows in FIG. 14. When anodic splicing to the silicon substrate 2, the upper glass substrate 3 is positioned on the silicon substrate 2 with the recess 3A on the lower side, and joined, while the lower glass substrate 4, is similarly positioned on the silicon substrate 2 with the recess 4A on the upper side, and joined. As a result, the swinging space for the movable plate 5 is formed as an air tight construction. When the upper and lower glass substrates 3, 4 are joined to the silicon substrate 2, if a bonding agent is used there is the possibility of gas infiltrating into the swinging space for the movable plate. However if as with the present embodiment, anodic splicing is used, then this problem does not arise.

Such a construction wherein the upper and lower glass substrates 3, 4 are anodic spliced to the silicon substrate 2, gives a space above and below the movable plate 5 of the depth of the recesses 3A, 4A. The swinging space for the movable plate 5 can thus be maintained without having a three layer construction for the silicon substrate 2. Moreover, with this embodiment, the swinging space for the movable plate 5 is sealed by the upper and lower glass substrates 3, 4 and the silicon substrate 2, so that the sealed space can be evacuated. As a result, the resistance to rotation of the movable plate 5 due to air can be eliminated enabling an increase in the oscillation amplitude of the movable plate 5.

Needless to say, with the single axis mirror galvanometer shown in FIG. 1 and FIG. 2 also, a construction is possible using an upper glass substrate the same as for the third embodiment, with the swinging space for the movable plate sealed and evacuated.

A fourth embodiment of a mirror galvanometer according to the present invention will now be described with reference to FIG. 15. Elements the same as for the abovementioned respective embodiments are denoted with the same symbol and description is omitted.

Figure 15:
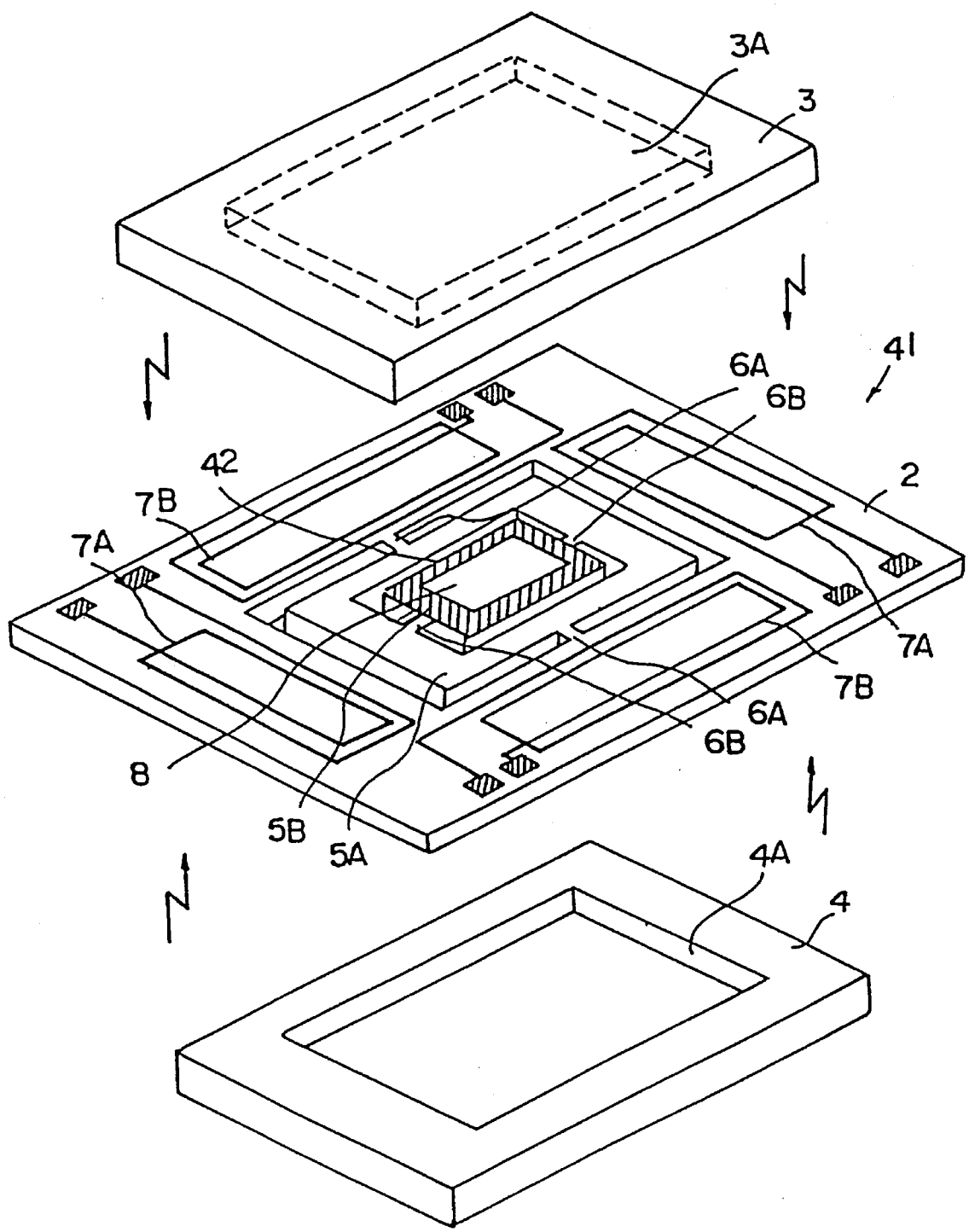
FIG. 15 is a perspective view showing the construction of a fourth embodiment of a mirror galvanometer according to the present invention.

As shown in FIG. 15, with a mirror galvanometer 41 of this embodiment, a thin film permanent magnet 42 is formed in a frame shape on the inner movable plate 5B of the silicon substrate 2 so as to surround the total reflecting mirror 8. On the other hand, planar coils 7A, 7A for moving the outer movable plate 5A, and planar coils 7B, 7B for moving the inner movable plate 5B are formed at respective opposite locations on the upper face of the silicon substrate 2 beside the movable plates 5A, 5B. Upper and lower glass substrates 3, 4 which are anodic spliced to the upper and lower faces of the silicon substrate 2 are respectively provided with recesses 3A, 4A in a similar manner to the embodiment shown in FIG. 14, to maintain a swinging space for the movable plates 5A, 5B With the above construction wherein the thin film permanent magnet 42 is provided on the movable plate, and the planar coils 7A, 7B are provided on the silicon substrate 2, the same operational effect as for the beforementioned respective embodiments can be realized. Furthermore, since in contrast to the beforementioned respective embodiments shown in FIG. 1, FIG. 10 and FIG. 14 a coil is not provided on the movable plate, then problems with heat generation do not arise. Moreover, since a thin film permanent magnet is used on the movable plate, then the situation of the movable plate becoming sluggish does not arise, and sealing of only the movable plate is also possible[?]. Furthermore, with the present embodiment, since the thin film permanent magnet can be integrally formed by semiconductor element manufacturing techniques, then a further size reduction is possible as well as facilitating the permanent magnet positioning step, with advantages such as a simplification of the manufacture of the mirror galvanometer. With the present embodiment, the construction is such that the permanent magnet is formed around the periphery of the total reflecting mirror. However the permanent magnet may be formed over the whole face of the inner movable plate and the mirror positioned on top.

FIG. 16 through FIG. 20 show measurement data related to the characteristics of the 2 axis mirror galvanometer.

Figure 16:
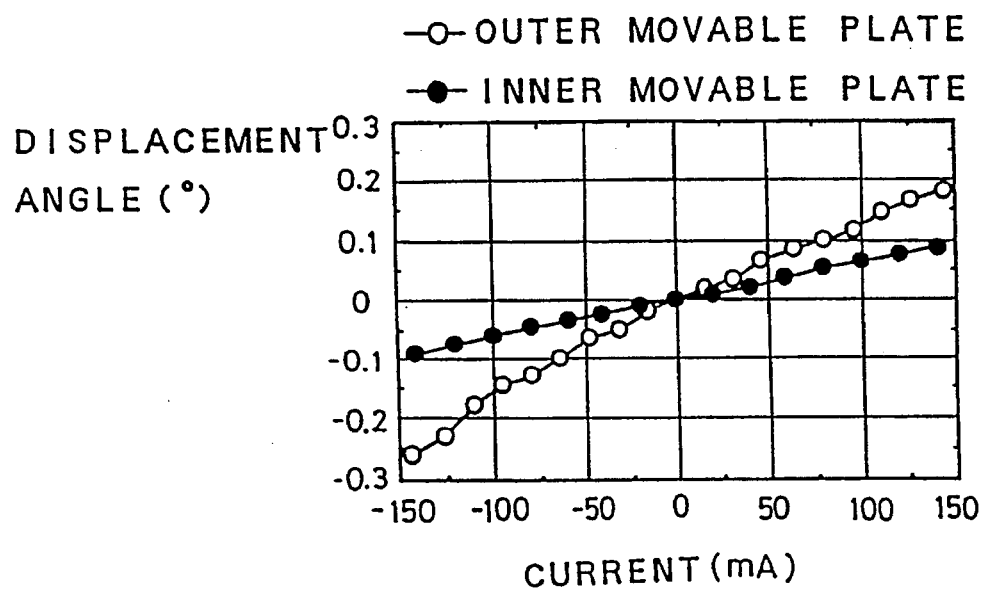
FIG. 16 is a graph of measurement data for a two axes arrangement showing the relationship between displacement angle and DC coil current in the inner and outer movable plates.
Figure 17:
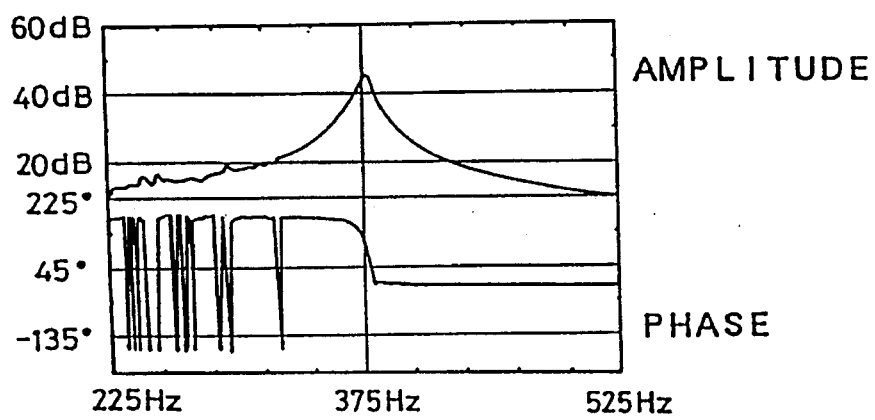
FIG. 17 is a graph of measurement data showing frequency oscillation characteristics of the outer movable plate.
Figure 18:
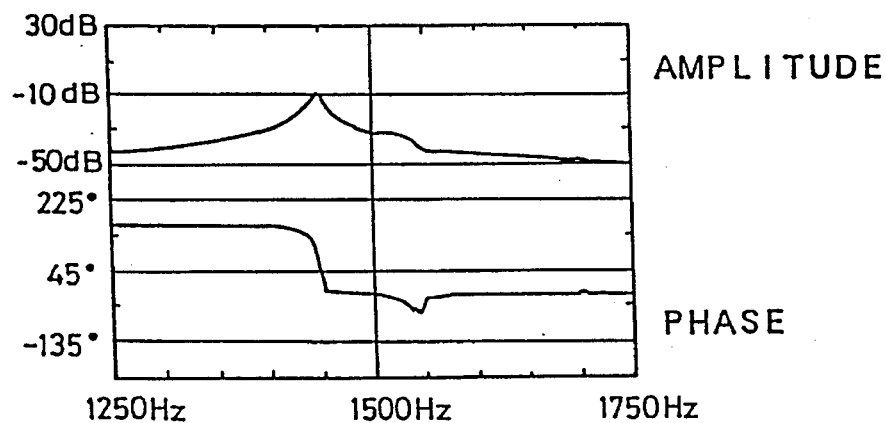
FIG. 18 is a graph of measurement data showing frequency oscillation characteristics of the inner movable plate.
Figure 19:
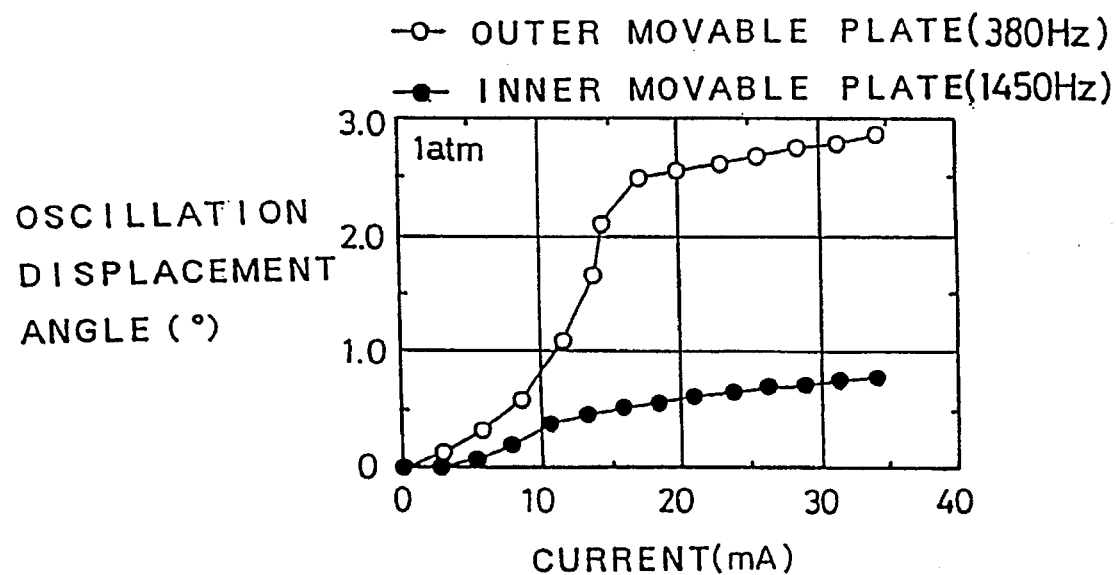
FIG. 19 is a graph of measurement data showing the relationship between displacement angle and AC coil current at the resonance frequencies of the inner and outer movable plates.
Figure 20:
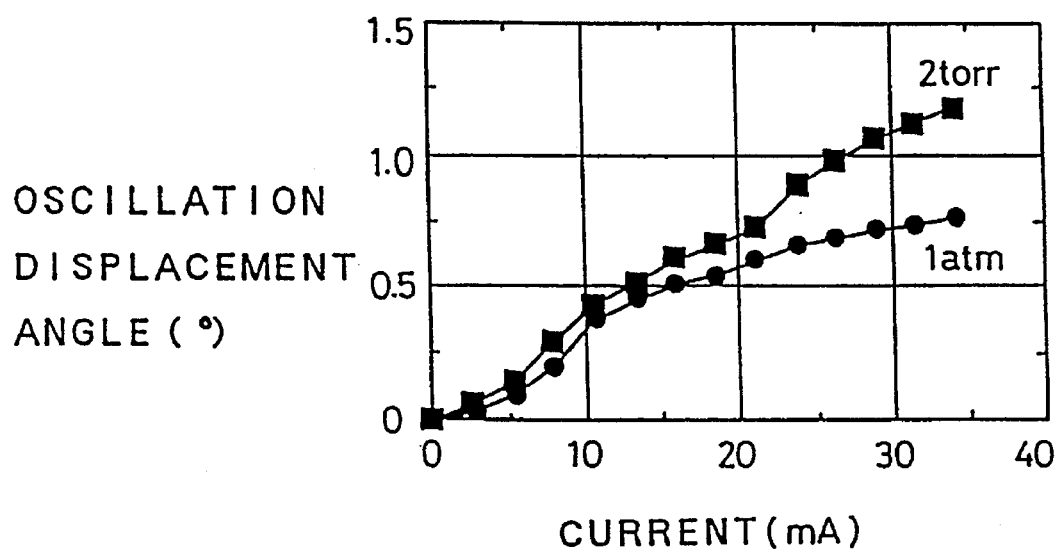
FIG. 20 is a graph of measurement data showing the relationship between displacement angle and AC coil current of the inner movable plate in a vacuum and in air.

FIG. 16 shows the relation between the DC current flowing in the coil and the displacement angle φ. FIG. 17 and FIG. 18 show the respective frequency characteristics for the displacement of the outer movable plate and inner movable plate. The resonant frequency is 375 Hz for the outer movable plate, and 1450 Hz for the inner movable plate. FIG. 19 shows the respective relationships between the current and the displacement angle during oscillation when alternating currents of the respective resonant frequencies flow in the coils. FIG. 20 shows the difference in the relationship for the inner movable plate between oscillation displacement angle and AC current, in a vacuum and in air. This shows a more linear relation in the vacuum and a greater oscillation amplitude.

With the present invention as described above, a silicon substrate is formed with a movable plate, a torsion bar for axially supporting the movable plate so as to be swingable, a planar coil and a reflecting mirror, and permanent magnets are provided on insulating substrates on upper and lower sides of the silicon substrate. The mirror galvanometer can therefore be made using semiconductor element manufacturing technology, so that compared to conventional mirror galvanometers, an extremely slim type and small size mirror galvanometers can be made. Accordingly, miniaturization of light scanning systems using mirror galvanometers is possible, enabling the miniaturization of equipment adapted for laser light.

Moreover, if the swinging space for the movable plate is made an air tight space and evacuated, then air resistance can be eliminated enabling an increase in the oscillation amplitude of the movable plate. Furthermore, by having a construction wherein the thin film permanent magnet is formed and located on the movable plate, and the coil is located on the silicon substrate beside the movable plate, then influence of heat from the coil on the movement of the movable plate is avoided.

INDUSTRIAL APPLICABILITY

The present invention enables a slim type and small size mirror galvanometer to be made, enabling the realization of, for example, miniaturization of equipment using mirror galvanometers. The invention thus has considerable industrial applicability.

We claim:

1. A planar type mirror galvanometer comprising: a semiconductor substrate having a planar movable plate and a torsion bar for axially supporting said movable plate so as to be swingable in a perpendicular direction relative to said semiconductor substrate formed integrally therewith, a planar coil for generating a magnetic field by means of an electric current, laid on an upper face peripheral edge portion of said movable plate, and a reflecting mirror provided on an upper face central portion which is surrounded by said planar coil, and magnets forming pairs with each other arranged so as to produce a magnetic field at planar coil portions on the opposite sides of the movable plate which are parallel with the axis of the torsion bar.

2. A planar type mirror galvanometer according to claim 1, wherein said movable plate comprises: a frame shape outer movable plate axially supported relative to said semiconductor substrate by a first torsion bar, and an inner movable plate axially supported inside said outer movable plate by a second torsion bar axially perpendicular to said first torsion bar, with a planar coil provided on an upper face of said outer movable plate, and a planar coil provided on an upper face peripheral edge portion of said inner movable plate, and said reflecting mirror provided on a central portion of said inner movable plate which is surrounded by said planar coil.

3. A planar type mirror galvanometer according to claim 1, wherein an upper substrate and a lower substrate are respectively provided on upper and lower faces of said semiconductor substrate, and said magnets are fixed to the upper substrate and the lower substrate.

4. A planar type mirror galvanometer according to claim 3, wherein said upper substrate and lower substrate seal a movable plate accommodating space, and the movable plate accommodating space is evacuated.

5. A planar type mirror galvanometer according to claim 4, wherein said upper and lower substrates have recesses in respective central portions thereof which face each other when fitted to the semiconductor substrate to form said moveable plate accommodating space.

6. A planar type mirror galvanometer according to claim 3, wherein said upper and lower substrates are insulating substrates.

7. A planar type mirror galvanometer according to claim 1, wherein said magnets are permanent magnets.

8. A planar type mirror galvanometer comprising: a semiconductor substrate having a planar movable plate and a torsion bar for axially supporting said movable plate so as to be swingable in a perpendicular direction relative to said semiconductor substrate formed integrally therewith, a permanent magnet provided on at least an upper face peripheral edge portion of said movable plate, and a reflecting mirror provided on an upper face central portion of said movable plate, and a planar coil for generating a magnetic field by means of an electric current, provided on semiconductor substrate portions beside the opposite sides of the movable plate which are parallel with the axis of said torsion bar.

9. A planar type mirror galvanometer according to claim 8, wherein said movable plate comprises: a frame shape outer movable plate axially supported relative to said semiconductor substrate by a first torsion bar, and an inner movable plate axially supported inside said outer movable plate by a second torsion bar axially perpendicular to said first torsion bar, with a permanent magnet provided on at least an upper face peripheral edge portion of said inner movable plate, and said reflecting mirror provided on a central portion of said inner movable plate.

10. A planar type mirror galvanometer according to claim 8, wherein an upper substrate and a lower substrate are respectively provided on upper and lower faces of said semiconductor substrate, and a movable plate accommodating space is sealed by said upper substrate and lower substrate, and the movable plate accommodating space is evacuated.

11. A planar type mirror galvanometer according to claim 10, wherein said upper and lower substrates have recesses in respective central portions thereof which face each other when fitted to the semiconductor substrate, to form said movable plate accommodating space.

12. A planar type mirror galvanometer according to claim 10, wherein said upper and lower substrates, are insulating substrates.

13. A planar type mirror galvanometer according to claim 8, wherein said magnet is formed over the whole face of the movable plate.

14. A planar type mirror galvanometer according to claim 8, wherein said magnet is of thin film construction.

15. A method of manufacturing a planar type mirror galvanometer comprising the steps of: piercing a semiconductor substrate excluding a portion forming a torsion bar, by anisotropic etching from the substrate lower face to the upper face to form a movable plate which is axially supported on the semiconductor substrate by the torsion bar portion so as to be swingable, forming a planar coil on the upper face periphery of the movable plate by electroplating, forming a reflecting mirror on a central portion of the movable plate which is surrounded by the planar coil by vapor deposition of aluminum, fixing an upper substrate and a lower substrate to upper and lower faces of the semiconductor substrate by anodic splicing, and fixing magnets to upper and lower substrate portions which correspond to the opposite edges of the movable plate which are parallel with the axis of the torsion bar.

16. A method of manufacturing a planar type mirror galvanometer according to claim 15, wherein said step of forming the planar coil includes: forming a nickel layer on the semiconductor substrate by sputtering, forming a copper layer on the nickel layer by copper electroplating, masking a portion corresponding to the planar coil portion, carrying out successive copper etching and nickel etching, removing said mask, and copper electroplating over the coil pattern.

17. A method of manufacturing a planar type mirror galvanometer according to claim 16, wherein when forming the copper layer on the nickel layer this is done by sputtering instead of by copper electroplating.

18. A method of manufacturing a planar type mirror galvanometer comprising the steps of: piercing a semiconductor substrate excluding a portion forming a torsion bar, by anisotropic etching from the substrate lower face to the upper face to form a movable plate which is axially supported on the semiconductor substrate by the torsion bar so as to be swingable, forming a thin film permanent magnet on the upper face of the movable plate, forming a reflecting mirror on a central portion of said movable plate by vapor deposition of aluminum, forming a planar coil on semiconductor substrate portions beside the opposite edges of the movable plate which are parallel with the axis of said torsion bar by electroplating, and fixing an upper substrate and a lower substrate to upper and lower faces of the semiconductor substrate by anodic splicing.

19. A method of manufacturing a planar type mirror galvanometer according to claim 18, wherein said step of forming the planar coil includes: forming a nickel layer on the semiconductor substrate by sputtering, forming a copper layer on the nickel layer by copper electroplating, masking a portion corresponding to the planar coil portion, carrying out successive copper etching and nickel etching, removing said mask, and copper electroplating over the coil pattern.

20. A method of manufacturing a planar type mirror galvanometer according to claim 19, wherein when forming the copper layer on the nickel layer, this is done by sputtering instead of by copper electroplating.

* * * * *